US010672075B1

(12) United States Patent
To

(10) Patent No.: US 10,672,075 B1
(45) Date of Patent: Jun. 2, 2020

(54) EFFICIENT USE OF COMPUTING RESOURCES THROUGH TRANSFORMATION AND COMPARISON OF TRADE DATA TO MUSICAL PIECE REPRESENTATION AND METRICAL TREE

(71) Applicant: Data Boiler Technologies LLC, Weymouth, MA (US)

(72) Inventor: Kelvin C. To, Weymouth, MA (US)

(73) Assignee: Data Boiler Technologies LLC, Weymouth, MA (US)

(*) Notice: Subject to any disclaimer, the term of this patent is extended or adjusted under 35 U.S.C. 154(b) by 0 days.

(21) Appl. No.: 16/373,625

(22) Filed: Apr. 2, 2019

Related U.S. Application Data

(63) Continuation-in-part of application No. 14/975,720, filed on Dec. 19, 2015, now abandoned.

(60) Provisional application No. 62/094,287, filed on Dec. 19, 2014.

(51) Int. Cl.
    *G06Q 40/04* (2012.01)
    *G10H 1/00* (2006.01)
(52) U.S. Cl.
    CPC .......... *G06Q 40/04* (2013.01); *G10H 1/0025* (2013.01); *G10H 2210/111* (2013.01)
(58) Field of Classification Search
    USPC ........................................................ 705/37
    See application file for complete search history.

(56) References Cited

U.S. PATENT DOCUMENTS

| 6,349,291 B1 | 2/2002 | Varma |
| 6,597,812 B1 | 7/2003 | Fallon et al. |
| 7,378,992 B2 | 5/2008 | Fallon |
| 7,415,530 B2 | 8/2008 | Fallon |
| 7,417,458 B2 | 8/2008 | Ahn et al. |

(Continued)

FOREIGN PATENT DOCUMENTS

KR 20070043571 A 4/2007

OTHER PUBLICATIONS

"17 CFR Part 180", Federal Register, vol. 76, No. 135; Jul. 2011.

(Continued)

*Primary Examiner* — Jason Borlinghaus
*Assistant Examiner* — Ambreen A. Alladin
(74) *Attorney, Agent, or Firm* — Caldwell Intellectual Property Law

(57) ABSTRACT

A system for processing and monitoring trade data receives and transforms trade activities to a musical piece representation, converts the representation to a metrical tree, and performs analysis that provides more accurate onset detection at accelerated speed with more efficient use of computing resources by placing more emphasis on the information hierarchically contained in the metrical tree than on the tree structure when comparing and matching trade patterns, such as potential market manipulation, market change signal, synthetically created trades, or likelihood that the set of trade activities will result in a market price move of one or more financial assets against plans. The analytical system further weights-in the identified signals and determines scores to reflect likelihood of trade irregularities. When the score does not meet a preconfigured threshold, a corresponding action is executed.

18 Claims, 22 Drawing Sheets

(56) References Cited

U.S. PATENT DOCUMENTS

| | | | |
|---|---|---|---|
| 7,417,568 B2 | 8/2008 | Fallon et al. | |
| 7,587,347 B2 | 9/2009 | Griffin et al. | |
| 7,689,499 B1 | 3/2010 | Duquette | |
| 7,701,456 B1 | 4/2010 | Buck | |
| 8,219,482 B2 | 7/2012 | Neri | |
| 8,526,621 B2 | 9/2013 | Rabin et al. | |
| 8,643,513 B2 | 2/2014 | Fallon | |
| 8,717,204 B2 | 5/2014 | Fallon et al. | |
| 8,723,701 B2 | 5/2014 | Fallon et al. | |
| 8,751,372 B1 | 6/2014 | Friedman et al. | |
| 9,054,728 B2 | 6/2015 | Fallon | |
| 9,116,908 B2 | 8/2015 | Fallon | |
| 2004/0055447 A1* | 3/2004 | Childs, Jr. ............... | G06Q 40/00 84/615 |
| 2005/0055267 A1* | 3/2005 | Chasanoff ............... | G06Q 40/04 84/609 |
| 2005/0240396 A1* | 10/2005 | Childs ................... | G10H 1/0025 704/207 |
| 2009/0157451 A1 | 6/2009 | Steuben et al. | |
| 2014/0095464 A1 | 4/2014 | Masuda | |
| 2014/0222655 A1 | 8/2014 | Cummings | |
| 2015/0081504 A1 | 3/2015 | Janas et al. | |
| 2015/0213789 A1* | 7/2015 | Plott ........................ | G10H 1/18 84/645 |
| 2018/0336632 A1 | 11/2018 | Neri | |

OTHER PUBLICATIONS

"17 CFR Section 240.10b-5—Employment of manipulative and deceptive devices"; Aug. 1951.
"Automating Energy an dCommodity Trade Surveillance—The Time is Now!"; Oracle; Jun. 2010.
"Big Data and Market Surveillance"; Scila; Apr. 2014.
"Frequently Asked Questions", Board of Governors of the Federal Reserve System, [retrieved from http://www.federalreserve.gov/bankinforeg/volcker-rule/faq.htm], Nov. 2015.
"NASDAQ Market Replay. A Quick Reference Guide"; NASDAQ; 2008.
"Replays Made Easy"; NASDAQ; 2013.
"Standards: Supervisory framework for measuring and controlling large exposures", Bank for International Settlements, Apr. 2014.
Albert S. Kyle, and Anna A. Obizhaeva, "Market microstructure invariance: Theory and empirical tests", University of Maryland, Jun. 2013.
Albert S. Kyle, and Anna A. Obizhaeva. "Market microstructure invariants." Available at SSRN 1687965 (Sep. 10, 2010).
David Rizo Valero, "Symbolic music comparison with tree data structures", Universitat d'Alacant, Aug. 2010.
David Rizo, and José M. Inesta. "New partially labelled tree similarity measure: a case study." Structural, Syntactic, and Statistical Pattern Recognition. Springer Berlin Heidelberg, Jan. 2010. 296-305.
Eric Cai, "Machine Learning Lesson of the day—Overfilling and Undertitting", StatsBlogs, [http://www.statsblogs.com/2014/03/20/machine-learning-lesson-of-the-day-overfitting-and-underfitting/], Mar. 2014.
Jones, Brad; "Identifying Speculative Bubbles: A Two-Pillar Surveillance Framework"; International Monetary Fund; Nov. 2014.
Nylen, Peter; "Developing and implementing an appropriate surveillance system and organisation"; Journal of Securities Operations & Sutody, vol. 6, No. 3, pp. 270-281; Dec. 2013.
Office of Financial Research, 2014 Annual Report, Dec. 2, 2014.
Office of Financial Research, Annual Report, Jul. 20, 2012, pp. 7-32.
Oliver Randall, "How inventory Holding Costs Affect Dealer Behavior in the US Corporate Bond Market", All-Georgia Finance Conference, Mar. 2013.
Pu Shen and Ross M. Starr, "Market-makers' supply and pricing of financial market liquidity", Economics Letters, vol. 76, Jun. 2002.
Rauchman, Michael, el al.; "Big Data in Capital Markets"; Middle Lake Partners LLC; Jun. 2013.
Sanford J. Grossman, and Merton H. Miller, "Liquidity and Market Structure", The Journal of Finance, vol. 43, No. 3, Papers and Proceedings of the 47th Annual Meeting of the American Finance Association, Chicago, Illinois, Dec. 28-30, 1987 (Jul. 1988), pp. 617-633.
Stanton-Cook, Sam et. al.; "Surveillance Techniques to Effectively Monitor Algo and High Frequency Trading"; KX; Apr. 2014.
Steven Manaster, and Steven C. Mann, "Sources of Market-making Profits: Man Does Not Live by Spread Alone." Unpublished working paper, Texas Christian University, Fort Worth, TX (Feb. 1999).

* cited by examiner

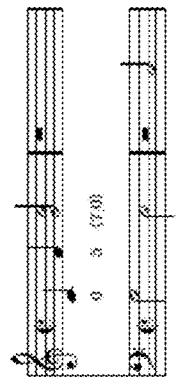
1AX1150
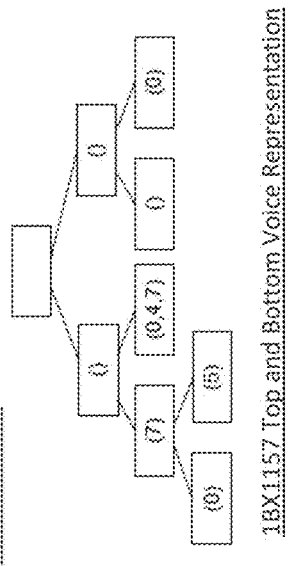
1BX1154
1BX1155 Top Voice Representation
1BX1156 Bottom Voice Representation
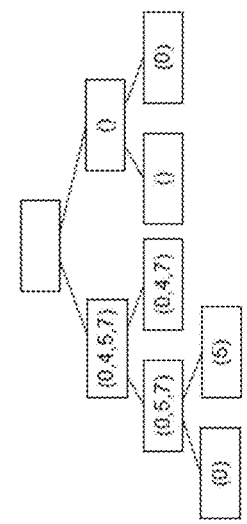
1BX1157 Top and Bottom Voice Representation
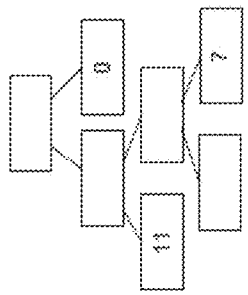
1BX1158 Top and Bottom Voice Representation with Propagation
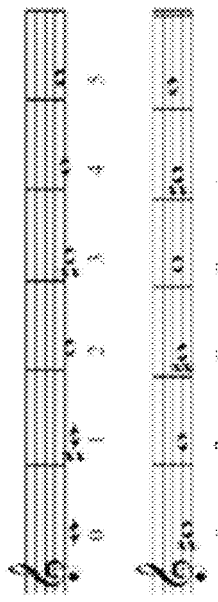
1AX1151
| Pitch Class | Tonal Counterparts |
|---|---|
| 0 | C (also B♯, D♭♭) |
| 1 | C♯, D♭ (also B♯♯) |
| 2 | D (also C♯♯, E♭♭) |
| 3 | D♯, E♭ (also F♭♭) |
| 4 | E (also D♯♯, F♭) |
| 5 | F (also E♯, G♭♭) |
| 6 | F♯, G♭ (also E♯♯) |
| 7 | G (also F♯♯, A♭♭) |
| 8 | G♯, A♭ |
| 9 | A (also G♯♯, B♭♭) |
| 10 t or A | A♯, B♭ (also C♭♭) |
| 11, e or B | B (also A♯♯, C♭) |
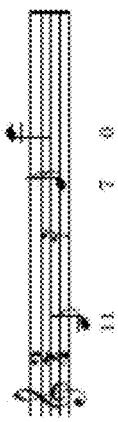
1AX1152
1AX1153
FIG. 6

Table 1

| Manipulation | Pattern | Flag / Quarantine & / stew scores |
|---|---|---|
| (i) Corner/ squeeze | jbeno | Stop trades that will impair clients with squeezed prices |
| (ii) Pump and dump scheme | bcine | Stop heavy sell orders |
| (iii) Boiler room tactics | lim bcne | Stop further sales of poor perform asset to retail |
| (iv) Paint the tape/ wash trade | fbd | Stop further sales of poor perform asset to retail |
| (v) Circular trading/ primary dealer scheme | ghica | Stop trades that will impair clients with discriminated prices |
| (vi) Forced liquidity scheme | kjunot | Stop strong buy orders |
| (vii) Stock bashing/ reverse corner/squeeze | kpcq | Stop strong buy orders |
| (viii) Manipulate price to prevent margin call | arce | Stop the related call option / synthetic call order |
| (ix) Spoofing/ layering/ stuff quote | vuce | Stop further cancel/amend activities |
| (x) Marking the close | fgdc | Stop trades that will destabilize price |
| (xi) Manipulated trade spikes | scuv | Stop quick reverse direction trades |

FIG. 10

*Frameworks & Algorithms*

| | Market | Clients/Counterparties | Instruments |
|---|---|---|---|
| Risk | Market depth, Sharpe ratio, imbalance, stress/baseline scenarios per CCAR/DFAST/COREP/FINREP (e.g. shock on derivatives, significant price decline/increase in risk premia), flash crash & other events | Likely results in conflict; how much, how quickly & life of hedges; observed variance on non-informed (noise) traders' inventory & number of core market-makers to gauge price fairness & best execution timing; changes in market maker's risk profile, etc. | Likely results in risk & price move; materiality, concentration, observed variance on asset payoff; likely losses from non-marketable collaterals; delta hedge of non-linear positions with linear instruments, etc. |
| Liquidity | Duration gap, portfolio immunization, liquidity coverage, opportunity costs (refinancing), etc. | Client's/own funding stability; initial/variable margins; end-of-date repo, concentration, > threshold % of capital, etc. | Cross-markets/venues liquidity sourcing, foreign exposure, contingent liquidity premia, etc. |
| Inventory | Maker-taker model, trade-through, price/time/size priorities, statistical arbitrage vs market making & other roles played in market; meaningful quote vs demand toxicity, etc. | Consistent timing & order size to route/execute clients' trades; channel strategy/appetite that maximize P&L and product availability; individual counterparty exposure > threshold; related party trans > threshold, etc. | ABC analysis (fast/slow), supply/demand reliability & elasticity; agent-based model, migration analysis, transaction cost analyzer, net exposure on particular asset class & instrument > threshold, etc. |

EFFICIENT USE OF COMPUTING RESOURCES THROUGH TRANSFORMATION AND COMPARISON OF TRADE DATA TO MUSICAL PIECE REPRESENTATION AND METRICAL TREE

CROSS-REFERENCES

The present application is a continuation-in-part of co-pending U.S. patent application Ser. No. 14/975,720 filed on Dec. 19, 2015, which claims priority to U.S. provisional patent application No. 62/094,287 filed on Dec. 19, 2014. Applicant hereby incorporates application Ser. No. 14/975,720 and 62/094,287 by reference in its entirety.

BACKGROUND OF THE INVENTION

One trading discipline employed to evaluate investments and identify trading opportunities is a technical analysis, which assumes that past trading activity and price changes of a security can be valuable indicators of the security's future price movements and focuses on the statistical analysis of price trends and patterns seen on charts. However, technical analysis is time consuming, and the tasks to plot charts and measure vectors graphically can take several minutes or seconds at best. Known methods of technical analysis fail to identify essentials signals or warnings in a timely manner, given that high-frequency trading (HFT) program trading platforms transact a large number of orders in fractions of a second. The HFTs have data velocity that operates at nanosecond speeds, where a thousand trades can happen within 100 milliseconds time span. Thus, the timeliness required for online analytical processing (OLAP) pattern recognition required in technical analyses is inadequate for the Regulatory Agencies, such as the SEC, FINRA, electronic marketplaces, such as the Stock Exchanges, HFTs and any serious market participants trying to achieve best execution. The amount of computer resources required to meet timeliness requirements is quite significant and burdensome.

Further, known methods for analyzing financial instruments and/or market trends for making investment decisions and for time series forecasting are error-prone for both type I (false positives) and type II (false negatives) errors. This is partly due to the lack of pattern recognition accuracy with known methods. Pattern recognition accuracy depends on data veracity; however, timestamps on trade messages (for submitting, modifying, and canceling trade orders and to receive order acknowledgements) are inexact due to unsynchronized clocks. Clock synchronization refers to techniques used to coordinate a common time notion among processes. Currently, the Financial Industry Regulatory Authority (FINRA) rules require a ±50 millisecond tolerance against the atomic clock of National Institute of Standards and Technology (NIST) and a 1 millisecond time stamp granularity for electronic trade messages. The known methods are unable to cope with this timestamp tolerance, leading to errors.

Further, known market surveillance and research techniques rely on humans' comparisons of graphs and charts, which lead to highly subjective evaluations. These known techniques thus lack sufficient objectivity.

Further, the analysis of trade data uses known techniques of data visualization, where vectors are measured graphically. However, these techniques of processing and reviewing graphical representations of large-sized trade data require significant computer resources. The cost of storing compressed trade data is also significant due to the hyper-increase in trade data volume.

Further, the confidentiality and secured delivery and retrieval of trade data in a timely manner is a priority concern. Current methods experience challenges in making access to market data, and thus market access, available to all market participants in a confidential and secure manner at the same speed.

Further, due to the complexity and fragmentation in capital markets, current technological tools are inadequate for aggregating or decomposing trade data such that the interconnectedness across markets and/or asset classes can be meaningfully identified.

Further, despite larger financial institutions and HFTs being equipped with artificial intelligence and supercomputers to advance their market surveillance/research methods, the efforts of these entities are siloed, which hinders best practices sharing within the industry and may cause a fairness concern for those who cannot afford such technologies. This further hinders collective response capabilities to sudden market surprises or stress conditions.

BRIEF SUMMARY OF THE INVENTION

Disclosed herein is a method for processing and monitoring trade data, and a corresponding system and a computer program product as specified in the independent claims. Embodiments of the present invention are given in the dependent claims. Embodiments of the present invention can be freely combined with each other if they are not mutually exclusive.

According to one embodiment of the present invention, a data processor receives a market data stream that includes a set of trade activities. The data processor transforms the set of trade activities to a musical piece representation and converts the musical piece representation to a metrical tree. An analytical system determines a score for the set of trade activities, where the score represents a likelihood of trade irregularities. In determining the score, the analytical system compares the metrical tree with sets of triggers, where each set of triggers includes at least a pattern of trade irregularity. When the metrical tree matches one or more of the sets of triggers, the analytical system adjusts the score to increase the likelihood. An analytical system provides more accurate onset detection at accelerated speed with more efficient use of computing resources by placing more emphasis on the information hierarchically contained in the metrical tree than on the tree structure when comparing and matching trade patterns, such as potential market manipulation, market change signal, synthetically created trades, or a likelihood that the set of trades will result in a market price move of one or more financial assets against plans. The analytical system further weights-in the identified signals and determines scores to reflect likelihood of trade irregularity. When the score does not meet a preconfigured threshold, a review system executes a corresponding action.

In one aspect of the present invention, in transforming the set of trade activities to a musical piece representation the data processor represents trade activity in the set as notes and trade inactivity as rests in the musical piece representation. Each note represents a trade order. The data processor places each note representing a buy order on a treble clef in the musical piece representation and places each note representing a sell order on a bass clef in the musical piece representation. The data processor sets a pitch of each note in the musical piece representation according to a price value and left of time a corresponding trade order will remain open and sets a tempo of the musical piece representation according to an average speed at which the set of trade orders were filled. The data processor sets a time signature of the musical piece representation according to a combination of trade instrument type, venue, and market conditions of the set of trade orders and/or processed trades.

In one aspect of the present invention, when converting the musical piece representation to a metrical tree, the data processor converts each note in the musical piece representation to a leaf node in the metrical tree by: setting a level of the leaf node in the metrical tree according to a duration of a corresponding note in the musical piece representation; ordering a plurality of nodes in the metrical tree according to a time order of the notes in the musical piece representation; parsing the metrical tree into plurality of tracks, where each track comprises a smallest discrete trading unit of the set of trade activities; and aggregate tracks into dimensions using a partially labelled tree comparison method, where each dimension is an organized group of multiple discrete trading units.

In one aspect of the present invention, each set of triggers includes the pattern selected from the group consisting of: potential market manipulation; market change signal; synthetically created trades; or likelihood that the set of trade activities will result in a market price move of one or more financial assets.

In one aspect of the present invention, when comparing the metrical tree with the sets of triggers, the analytical system computes an average of chances of finding a labelled leaf in a descendant of a non-labelled inner node in the metrical tree and recursively perform the computation until no match of trade activities similar to a trigger stored in a lesson database is found within a corresponding time span. The analytical system further measures the distances between the metrical tree with other metrical trees in lessons stored in the lesson database using a nearest neighbor rule and organizes the lessons in the corpus into genres and use a trigger counter to identify a set of possible matching lessons. Using the distances, the genres, and the trigger counter, the analytical system identifies lessons in the set of possible matching lessons that match the metrical tree.

In one aspect of the present invention, when the score does not meet the preconfigured threshold, the analytical system flags the set of trade activities. When the score meets the preconfigured threshold, the analytical system determines whether the set of trade activities is a synthetically created trade or whether aggregate risks for the set of trade activities match a set of predetermined criteria. When the set of trade activities is the synthetically created trade or the aggregate risks match the set of predetermined criteria, the analytical system flags the set of trade activities. A review system processes the flagged set of trade activities, determines the corresponding action, and executes the corresponding action.

These and other aspects, features and advantages, of the present invention will become apparent from the following detailed description of preferred embodiments that is to be read in connection with the accompany drawings.

BRIEF DESCRIPTION OF THE SEVERAL VIEWS OF THE FIGURES

FIG. 6 illustrates a method for transforming, composing, or decomposing of real-time trade order data or processed trades into metrical trees according to some embodiments.

FIG. 10 illustrates a table of example triggers in the lessons database according to some embodiments.

FIG. 14 illustrates exemplary frameworks and algorithms for use with the analytical system according to some embodiments of the present invention.

DETAILED DESCRIPTION OF THE INVENTION

Figure 1:
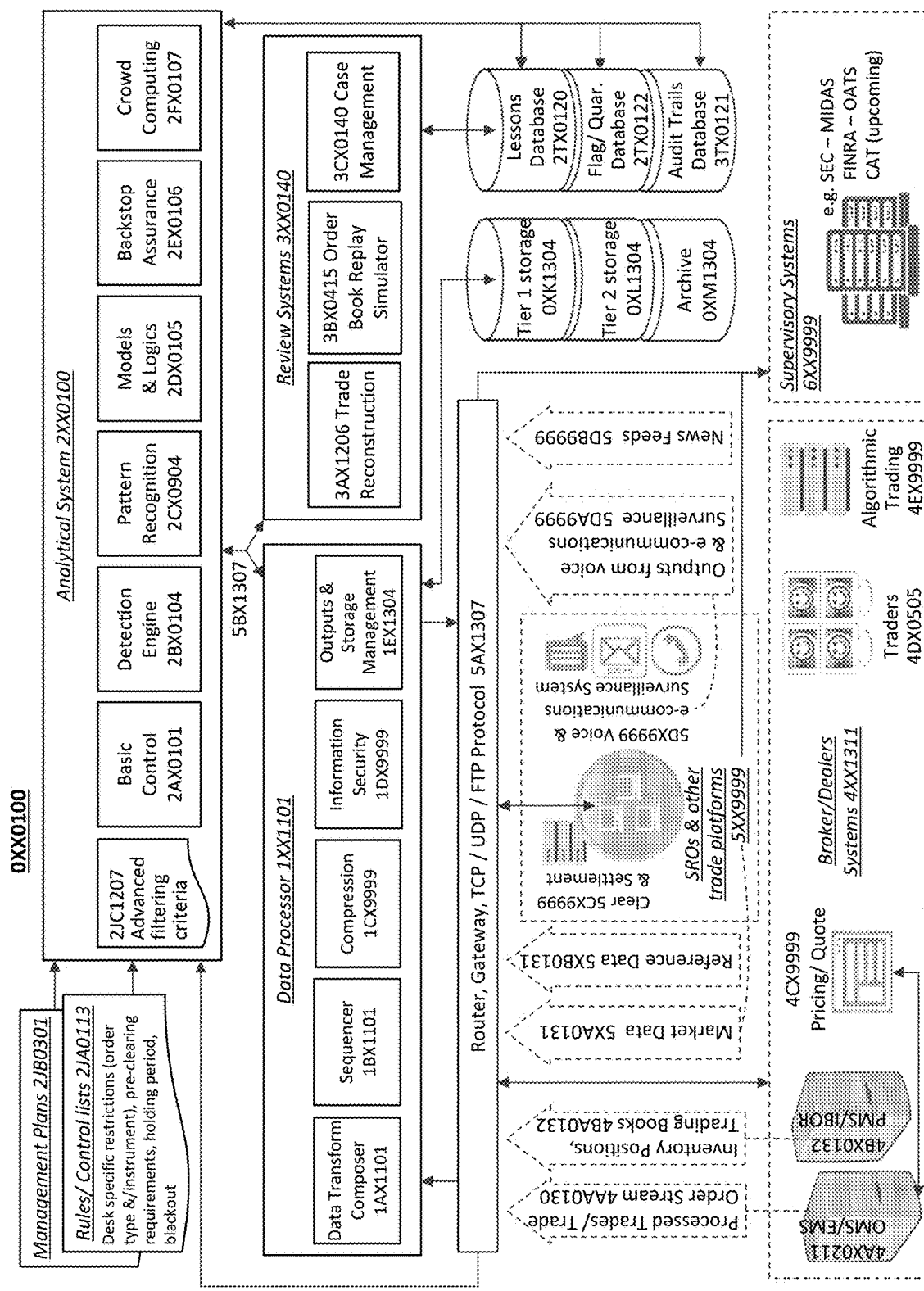
FIG. 1 illustrates a block diagram of a representative system comprising components for at least the processing and analysis of real-time and/or historical trade order data and/or processed trades according to some embodiments.

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

Reference in this specification to "one embodiment", "an embodiment", "an exemplary embodiment", or "a preferred embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments. In general, features described in one embodiment might be suitable for use in other embodiments as would be apparent to those skilled in the art. The appearance of "and/or" means at least one of a first element/feature and a second element/feature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the present invention provide: more accurate detection of onset signals at accelerated speed while using fewer computer resources; pattern recognition methods that are more tolerable to unsynchronized clocks; more objective and quantifiable ways to surveil or research across the markets and/or asset classes; better data compression and obfuscation techniques to substantially reduce storage requirements while preserving richness and confidentiality of information; simplified way to meaningfully aggregate or decompose financial records which enable a more robust trade reconstruction and order book replay process; and crowd computing and other components where shared best practices and intelligence are developed and used to guide and fine-tune parameters and filtering mechanism used in monitoring and managing trade activities, identifying irregular patterns, and detecting and investigating potential misconducts.

FIG. 1 illustrates a system 0XX0100, comprising components for the processing and analysis of real-time trade order data and/or processed trades according to some embodiments. The system 0XX0100 includes a data processor 1XX1101 for the processing, compressing and sequencing of real-time or historical trade order data or processed trades using an audio or metrical trees approach with tuning and information security controls. The system 0XX0100 further includes an analytical system 2XX0100 for the analyzing of trade activities using a hybrid of rules-based and pattern recognition techniques. The system further includes a review system 3XX0140 for reconstructing trade and market events for the purposes of investigating potential trade misconduct.

The data processor 1XX1101 receives a plurality of inputs via a gateway 5AX1307. In some embodiments, the inputs include, but are not limited to: processed trades or a trade order stream 4AA0130; inventory positions and trading books 4BA0132; market data 5XA0131; reference data 5XB0131; outputs from a voice and E-communications surveillance system 5DA9999; and various news feeds 5DB9999. The data processor 1XX1101 includes: a data transform composer 1AX1101; a sequencer 1BX1101; a compression component 1CX9999; an information security component 1DX9999 and an outputs and storage management component 1EX1304. The data processor 1XX1101 and its components are described further below with reference to FIGS. 3-6.

The analytical system 2XX0100 receives rules or control lists 2JA0113 and management plans 2JB0301, and data from other components in the system 0XX0100, as input. The analytical system 2XX0100 uses a set of advanced filtering criteria 2JC1207 and includes: a basic control component 2AX0101; a detection engine 2BX0104; a pattern recognition component 2CX0904; a models and logics component 2DX0105; a backstop assurance component 2EX0106; and a crowd computing component 2FX0107. The analytical system 2XX0100 and its components are described further below with reference to FIGS. 7-17.

The review systems 3XX0140 includes: a trade reconstruction component 3AX1206; an order book replay simulator 3BX0415; and a case management component 3CX0140. The review systems 3XX0140 and its components are described further below with referenced to FIGS. 18-21.

The components of the system 0XX0100 are configured to communicate over various communication channels 5BX1307. The analytical system 2XX0100 and review systems 3XX0140 are configured with access to an audit trails database 3TX0121, a lessons database 2TX0120, and a flag/quarantine database 2TX0122. The data processor 1XX1101 further communicates, via a gateway 5AX1307, with broker or dealer systems 4XX1311, supervisory systems 6XX9999, self-regulatory organizations (SROs) and other trade platforms 5XX9999, voice and e-communications surveillance system 5DX9999, and a clear and settlement 5CX9999 (e.g. a central stock clearing system). The broker-dealers systems 4XX1311 can include order management system and/or execution management system (OMS/EMS) 4AX0211 that interacts with market makers' pricing and quotes systems 4CX9999 and portfolio management system/investment book of records (PMS/IBOR) 4BX0132. The brokers and dealers system 4XX1311 consists of both manual trades by traders 4DX0505 and algorithmic trading by machines 4EX9999.

In some embodiments, the data processor 1XX1101 composes the financial data into audio representation or metrical tree with tuning, compression, encryption, and other functions for: market data distribution and sharing between SROs and other trade platforms 5XX9999 and other market participants, such as broker/dealers systems 4XX1311; preparing data for analytics by the analytical system 2XX0100 and review by the review systems 3XX0140; and trade reporting, data management, etc.

In some embodiments, the analytical system 2XX0100 uses a hybrid of rules-based and pattern recognition methods to: implement risk and compliance controls; conduct research and market surveillance; and monitor a house's trade activities, market behaviors, etc.

In some embodiments, the review system 3XX0140 serves as outputs and interfaces, implemented by: trade reconstruction component 3AX1206 for the review of the sequence of trade events; order book replay simulator 3BX0415 to simulate market dynamics, back-test and evaluate scenarios; and the case management component 3CX0140 to manage cases (from alerts generated from the analytical system 2XX0100), monitor timely and proper closure of identified issues, document audit trails in the audit trails database 3TX0121, discover lessons learned and feedback through the crowd computing component 2FX0107 for support of customized scrutiny and the fine-tuning of controls, and facilitate on-going improvement actions.

Figure 2:
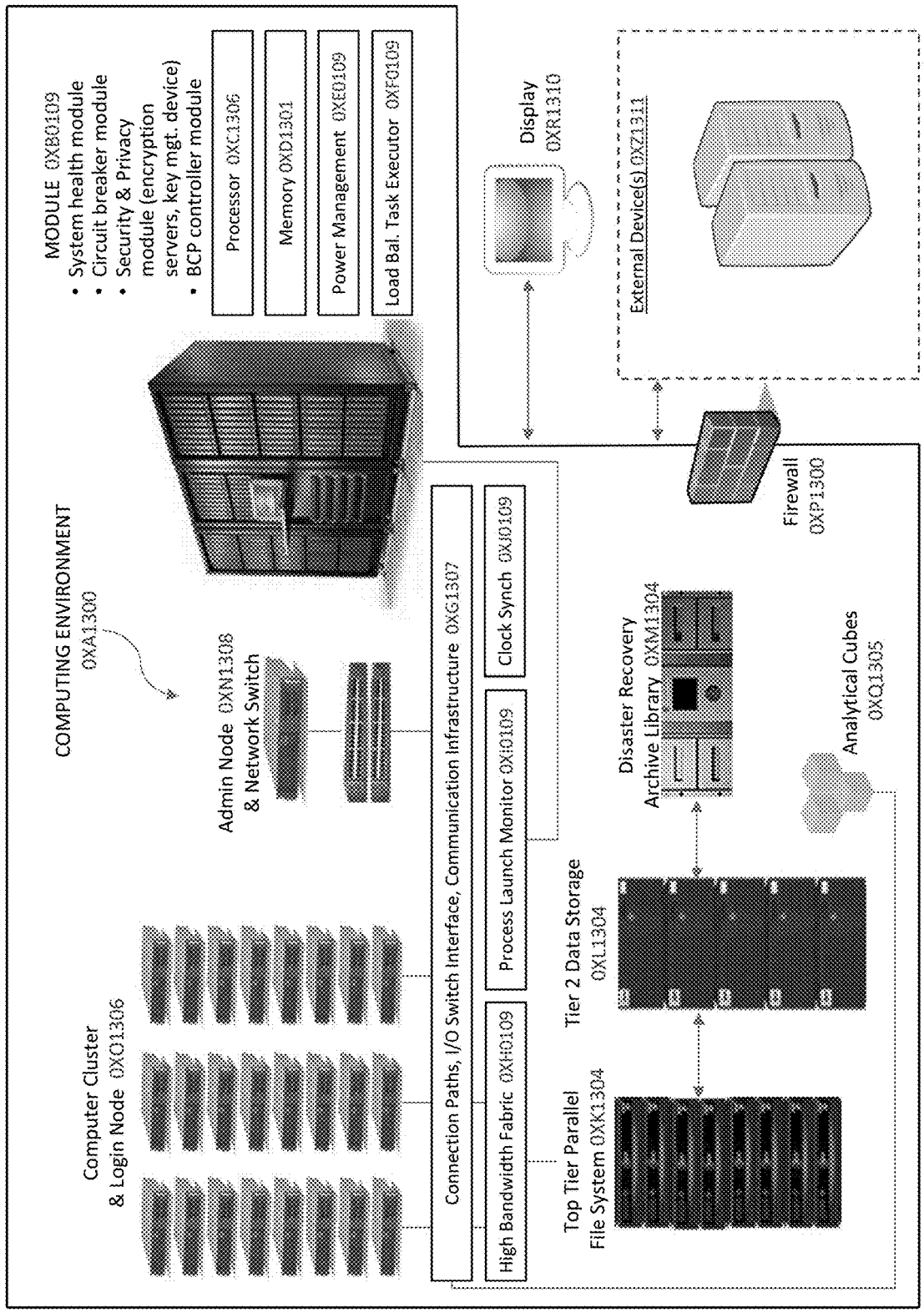
FIG. 2 illustrates a computing environment according to some embodiments.

FIG. 2 illustrates a computing environment 0XA1300 according to some embodiments. The computing environment 0XA1300 includes components for the processing, compressing, sequencing of trade data, for reconstructing market events, for monitoring of trade behavior, and for identifying and investigating potential misconduct. The computing environment 0XA1300 comprises high-performance computing components, such as those typically found in a cluster-architecture. The components include, but are not limited to: a computer cluster and login node 0X01306; an administrative node and network switch 0XN1308; and one or more computing components 0XB0109, such as system health module, circuit breaker module, security and privacy module (including encryption servers and key management devices), and business continuity plan (BCP) controller module. The modules 0XB0109 include a processor 0XC1306, memory 0XD1301, power management 0XE0109, and load balancing task executor components 0XF0109. The computing environment 0XA1300 further includes various components that form a communication infrastructure 0XG1307 over which the components communicate, such as connection paths, I/O switch interfaces, and high bandwidth fabrics 0XH0109. The coordination of computer cluster 0XO1306 and communications are monitored via a process launch monitor 0X10109 and are synchronized according to a synchronization clock 0XJ0109. The computing environment 0XA1300 further includes storage, such as a parallel file system 0XK1304, data storage 0XL1304, and a disaster recovery archive library 0XM1304. Other computing components, such as analytical cubes 0XQ1305 can be configured to communicate with the components in the computing environment 0XA1300. The computer system 0XA1300 resides behind a firewall 001300 for secure communication with external devices 0XZ1311. A display 0XR1310 can further be coupled to the computing components 0XQ1305. In some embodiments, the computing environment 0XA1300 yields accelerated performance to delivery computing results, while requiring fewer computing resources (particularly, less GPU, CPU, memories, and power consumption, as well as substantial reduction in data storage) because the subject no longer requires processing and analyzing lots of images, has fewer complex calculations, and uses other advanced techniques, as described further below.

Data Processor

Figure 3:
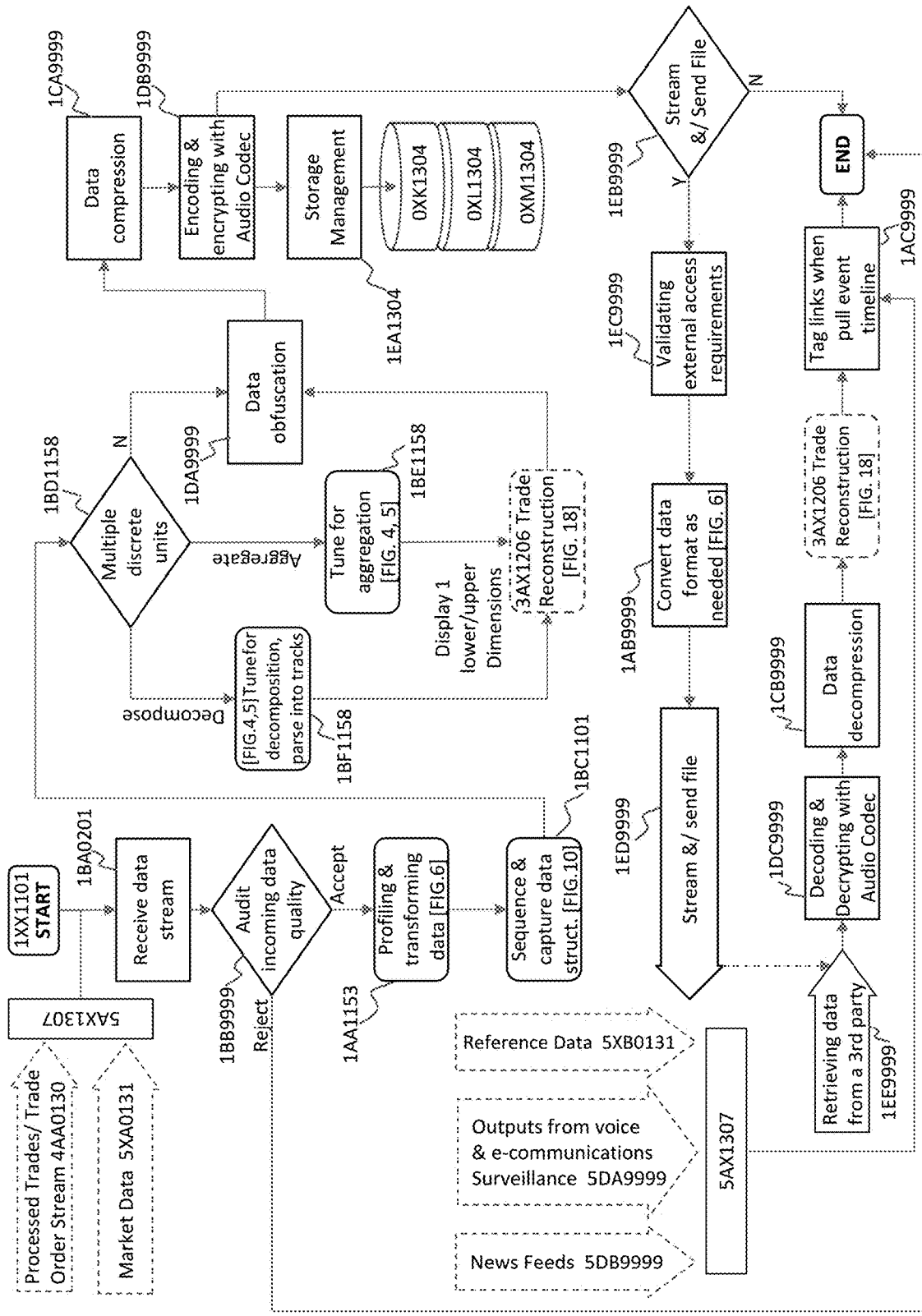
FIG. 3 is a flowchart illustrating a method the processing and sequencing of real-time or historical trade data and/or processed trades, implemented by the data processor, according to some embodiments.

FIG. 3 illustrates a method for the processing and sequencing of real-time or historical trade data and/or processed trades, implemented by the data processor 1XX1101, according to some embodiments. Unlike conventional approaches that require exactitude of clock synchronization before the sequencing of data, or else it would significantly affect the shape of the plotted charts, which in turn causes much inaccuracy when measuring vectors graphically, some embodiments of the present invention is more tolerable of clock synchronization issues by placing more emphasis on the information hierarchically contained in the tree than on the tree structure, as described further below with reference at least to FIG. 9. At block 1BA0201, the data process 1XX1101 receives as input a stream of market data 5XA0131, and possibly also historical processed trade records or a current trade order stream 4AA0130 containing pricing information via protocols or gateways 5AX1307. Market data 5XA0131 may include, but is not limited to: order acknowledgements; order executions; order confirmations; open orders; market orders; basic market data or level one data such as bid price, bid size, ask price, ask size, last price, and last size; volume information; additional market data or level two data, such as market data that relates to order book or depth of the market including highest bid prices that traders are willing to pay to buy a security (e.g. five or ten prices depending on the market); bid sizes (e.g. the number of securities that are available at each of the highest bid prices); lowest ask prices that traders are willing to accept to sell a security; ask prices or the number of securities that are available at each of the lower ask prices; and next best bid; quotes; open interest (e.g. the number of buy market orders before the stock market opens); change in open interest; exchange for related position (EFRP) volume; the number of securities available for sale; the number of securities sought to be purchased at each offer and bid price; information regarding cancelled, non-published, non-completed and/or unexecuted orders; and calculated market data (e.g. imbalances and indices) and other price information. Market data 5XA0131 may also include aggregation of various elements of market data, such as an aggregated set of trading volume information. The market data 5XA0131 may be publicly available or non-publicly available. Market data 5XA0131 may be provided by or generated from a variety of sources. For example, sources of market data may include, but are not limited to: backend order management systems; order fulfillment systems; exchanges; exchange matching engines (processing buy/sell orders and applying different rules of different exchanges); equity trading facilities such as alternative display facilities (ADFs); electronic communication networks (ECNs) for matching buy and sell orders, used, for example, to connect brokers to individual traders for processing orders; security information processors (SIPs) for carrying trade and order information under the consolidated tape association (CTA) or unlisted trading privilege (UTP) plan; and trade or transaction reporting services (e.g. TRACE). The recipients of market data 5XA0131 may include a variety of stakeholders, some of whom use the market data for various purposes upon receipt. These recipients may include, but are not limited to: institutional traders; brokerages; high frequency traders; retail investors; individual traders; exchanges (because they often consume the data of other exchanges); alternative trading systems (ATS or "dark pools"); and analysts, industry regulators, and market data providers or market data vendors. Market data may be sent shortly after it is generated, and as continuously as possible, subject to consolidation rules for consolidated streams. The sources of market data operate a data service implemented using "send rules" based on continuous sending of market data.

The data processor 1XX1101 can receive market data 5XA0131 from a plurality of different sources of marketplace data, both local and international sources, which are aggregated across asset classes, into a consolidated stream of order book states. The market data 5XA0131 may be provided in the form of raw data, communicated as network packets. In some embodiments, market data 5XA0131 may also be provided as formatted or unformatted data, such as media files or with formatting applied. The information in the market data 5XA0131 may further be provided in a variety of formats, such as, but not limited to, extended markup language (XML), Microsoft Excel spreadsheets (XLS), comma separated values (CSV), text files (TXT), etc. Similar to the market data 5XA0131, the house's historical processed trade records or current trade order stream 4AA0130 contain bid price, ask price, and volume information. Traders 4DX0505 (see FIG. 1) at a broker or dealer firm enter orders into an order management system (OMS) or execution management system (EMS) 4AX0211. The OMS/EMS system 4AX0211 records details of a trade that includes information, such as the time, price, order size, and a specification of whether it was a buy or sell order, and create the trade blotter accordingly. A trade blotter is a record of trades and the details of the trades made over a period of time. The purpose of a trade blotter is to carefully document the trades so that they can be reviewed and confirmed by the trader or the brokerage firm. The trade order stream 4AA0130 can also be a live feed running parallel to the OMS/EMS 4AX0211 that encompasses orders, cancellations, or trade amendments initiated from various trading desks 4DX0505, order feeds from algorithmic trading systems 4EX9999, or market makers' pricing/quote system 4CX9999, locally and internationally, and across asset classes. A market maker is a firm that stands ready to buy and sell a particular stock on a regular and continuous basis at a publicly quoted price. You'll most often hear about market makers in the context of the Nasdaq or other "over the counter" (OTC) markets. Market makers that stand ready to buy and sell stocks listed on an exchange, such as the New York Stock Exchange, are called "third market makers." Many OTC stocks have more than one market maker.

At block 1BB9999, the sequencer 1BX1101 audits the incoming data quality to ensure that the input data stream includes essential data elements. If the sequencer 1BX1101 determines that incoming data fails quality requirements, then the data is rejected. Otherwise, the data is accepted (block 1AA1153). The data points in the incoming data is transformed to a musical notes or metrical trees representation, as described further below with reference to FIG. 6. In this exemplary embodiment, trade orders from the trade order stream 4AA0130 are modeled after the temporal and hierarchical structure of a music piece. Like a music piece, the trade order stream 4AA0130 includes activities (notes) and inactivity (rests). In music, notes placed on a staff convey the tone or pitch of the note, while the type of note (whole note, half note, quarter note, etc.) conveys the duration of the note. The musical staff includes two types: a treble clef ( ) (for the higher tones); and bass clef (') (for the lower tones). In this exemplary embodiment, trade orders are represented using musical notes on a staff. A note represents a trade order. The placement of the note (i.e., trade order) on the treble clef represents a buy order, while the placement of the note on the bass clef represents a sell order. The pitch of the note represents the price value and how long the trade order will remain open (e.g. notes ascending the staff represents a trading desk with a bullish view, and notes descending the staff represents a trading desk with a bearish view). In music, a piece is divided into measures (or "bars"), where the duration of the measure is defined by a meter or time signature. The total duration of the notes and rests within a measure equals the time signature. The tempo or beat of the music represents the average speed at which a trade order has been filled. The time signature of a measure represents a combination of the trade instrument type, venue, and market conditions of the trade orders. The rhythm of the musical representation may be explicitly encoded or implicitly represented under a pitch class representation method. A "pitch class" in music is a set of pitches that are whole octaves apart (e.g. C pitches in all octaves). In FIG. 6, staffs 1AX1150 and chart 1AX1151 illustrate example pitch classes and their tonal counterparts. This example illustrates a 12-tone equal temperament (i.e., every pair of adjacent pitches are separated by the same interval) chromatic scale on C, with one full octave ascending (noted only with sharps (♯)). The trade order patterns, represented as music in the above described manner, is then converted into metrical trees by the data transform composer component 1BX1101. As an example of the pitch class representation, the melody representation 1AX1152 is converted to the metrical tree 1AX1153 as illustrated in FIG. 6. The level of a leaf in the tree 1AX1153 determines the duration of the note it represents. The left to right ordering of tree nodes depicts the time order of the notes in the melody.

Returning to FIG. 3, at block 1BC1101, the sequencer 1BX1101 captures the temporal and hierarchical structure and the metrical trees, as well as the metadata, according to trade sequence priorities (e.g. the typical price/time priority where orders are automatically sorted according to price and time-of-entry criteria, or size/time priority where orders are first ranked according to their order size then time). Capital market trade activities are dynamic with many streams of activities, similar to many voices simultaneously playing polyphonic music. To represent multiple streams of activities as polyphonic music, each "voice" or stream is inserted into the same tree in the manner described above, with the voices overlaid. Since buy orders are represented with the treble clef and sell orders are represented by the bass clef, there will typically be at least two layers in the representation, and the number of overlaid layers will increase as the trading volume increases.

FIG. 6 further illustrates an example polyphonic melody representation 1BX1154. The melody representation 1BX1154 may be converted as two monophonic trees 1BX1155 and 1BX1156, with a first tree 1BX1155 representing the top voice in the treble clef, and a second tree 1BX1156 representing the bottom voice in the bass clef. Node labels in trees 1BX1155 and 1BX1156 represent a pitch class per node. Alternatively, both voices are represented in the same tree 1BX1157. In the tree 1BX1157, each node contains all of the notes played at a given time, whose depth is conditioned by the note with the shortest duration.

Node labels in tree 1BX1157 represent the set of pitch classes, instead of a single pitch class as with trees 1BX1155 and 1BX1156. A node representing only rests has an empty set.

Optionally, a bottom-up labels propagation may be implemented in order to remove irrelevant information (noise) that would make the classification or identification of main features of the melody (signals) more difficult. As illustrated in tree 1BX1158, node labels are propagated from the bottom-up based on the nodes' positions in the tree.

Returning to FIG. 3, at block 1BD1158, the sequencer component 1BX1101 either aggregates polyphonic data for consolidated view and display of data (block 3AX1206), where the data is parsed into tracks and tuned for aggregation (block 1BE1158). Alternatively, the polyphonic data is decomposed into monophonic tracks for viewing and display of data (block 3AX1206) at lower level dimensions or the smallest discrete trading unit, where the data is tuned for decomposition and parsed into tracks (block 1BF1158). As used herein, the terms 'discrete unit' or 'trading desk' refer to each discrete unit that is engaged in the coordinated implementation of a revenue-generation strategy and that participates in the execution of any covered trading activity. This includes: (a) each unit being a "trading desk", which may be the smallest unit of an organization used by an entity to structure and control its risk-taking activities and employees; (b) each organizational unit that is used to structure and control the aggregate risk-taking activities and employees of one or more trading units; (c) management or reporting divisions, group, sub-groups, or other intermediate units of organization used to manage one or more discrete trading units; (d) all trading operations collectively; (e) any other unit of organization specified by regulators with respect to a particular financial entity. Multiple discrete units can be aggregated together to form a 'dimension'.

Figure 4:
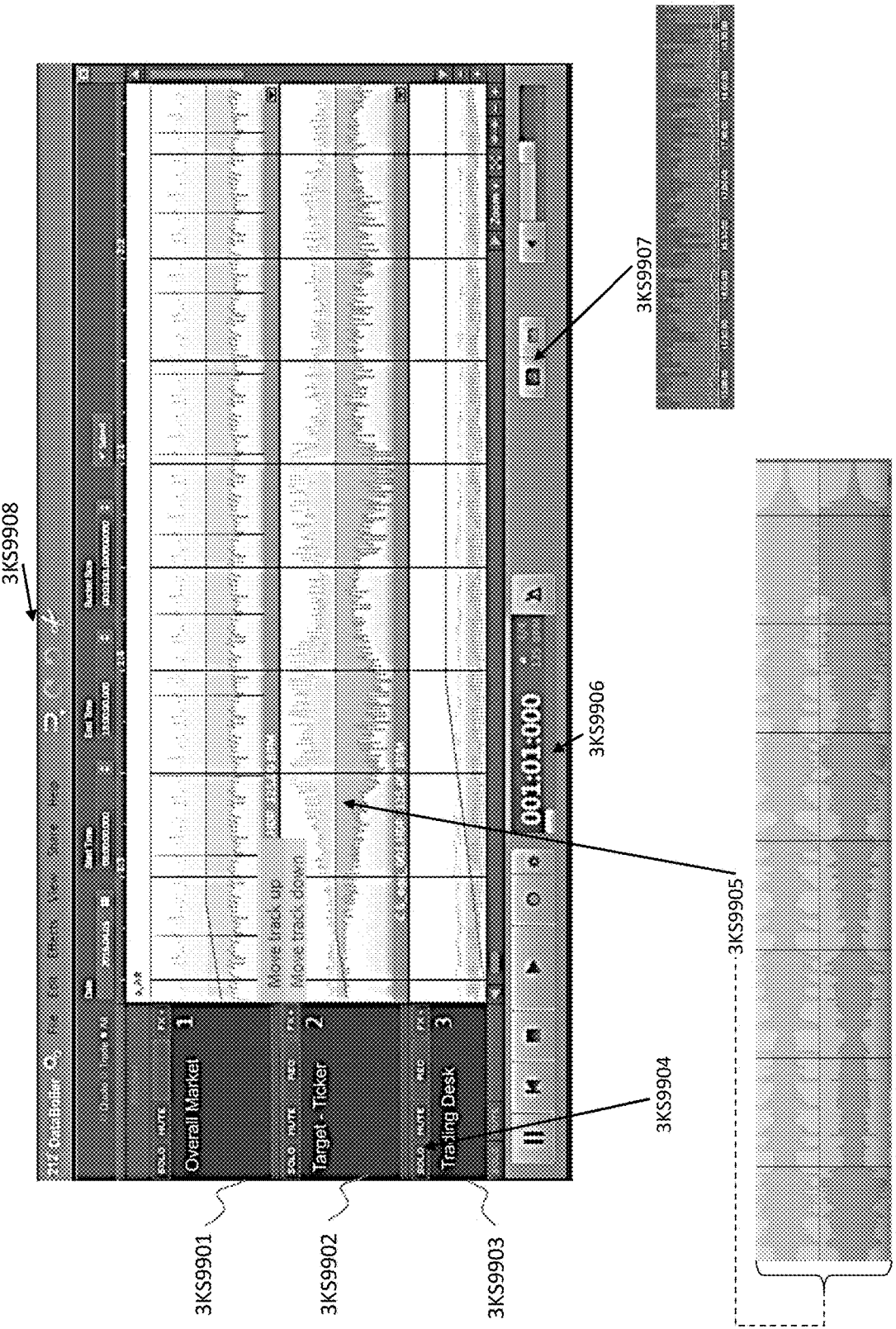
FIG. 4 illustrates an example user interface or display window for trade activities.

FIG. 4 illustrates an example user interface or display window 3KS9908 for trade activities. In some embodiments, the user interface 3KS9908 is a part of the trade reconstruction component 3AX1206 and the order book replay simulator 3BX0415, used with the composer 1AX1101 and sequencer 1BX1101 to: compile trade activities in-house or in the markets as 'tracks'; aggregate or decompose 'tracks' to upper, lower, or both upper and lower 'dimensions', and play, edit and save the records. 'Tracks' or 'MIDI tracks' in audio are for recording and playing back parts of sound or music, and each track has a corresponding channel in the audio mixer console. Similarly, financial products are distributed via different channels (e.g. the retirement and insurance channel, retail channel via discount brokerage firms like Charles Schwab, institutional channels (hedge funds, proprietary trading firms), etc.). From a trading operation perspective, there can be multiple trading desks. Some focus on trading foreign exchange (FX), interest rate, other focus on equity markets, fixed-income, or treasury and/or agency products. The trading desks may be organized into groups and sub-groups, such as by countries, or large-cap/thinly traded penny stock, or value vs growth strategy, or algorithm desks versus human traders, etc. Again, each 'track' refers to the smallest 'discrete trading unit' and as used herein, aggregated discrete units form a 'dimension'.

The example user interface 3KS9908 includes a consolidated view of all tracks 3KS9901, a replay at a lower dimension 3KS9902 (e.g. the 'Target' to replay is a ticker symbol), trade data decomposed to a 'discrete unit' 3KS9903 (e.g. trade data for a particular trading desk), a display of the synchronized time 3KS9906, a button 3KS9907 to toggle between an audio spectra display and a traditional chart display, and a control button 3KS9904 to dim other tracks to tune the effect on a particular track ('solo mode'), a change of the display of a target 3KS9905 to 'stereo' mode to show and compare buy/sell-side activities. The user interface 3KS9908 provides an easier way (e.g. by drag-and-drop) to meaningfully aggregate or decompose financial records by using reverb and other tuning or simulation methods to replicate depth-of-book, and assimilate and represent market dynamics. Complex calculations, such as of asset pricing or payoffs, and deciphering correlations between rollup and the underlying dimensions, are avoided, thus saving computing and processing resources.

Returning to FIG. 3, at block 1DA9999, the information security component 1DX9999 obfuscates any confidential or sensitive personally identifiable information. Trade strategies are often proprietary secrets, and one's own trade data or how brokerage firms are trading on behalf of clients ought to be properly protected because hackers may use stolen trade data to exploit the trade strategies in illicit front-running or other abusive acts. Therefore, trade data should be encrypted and obfuscated as appropriate. Obfuscation involves modifying the format of the data so that it is not readily readable or accessible. The transformation of trade data into a musical format, as described above, allows for a new obfuscation method to mask or hide the information.

Figure 5:
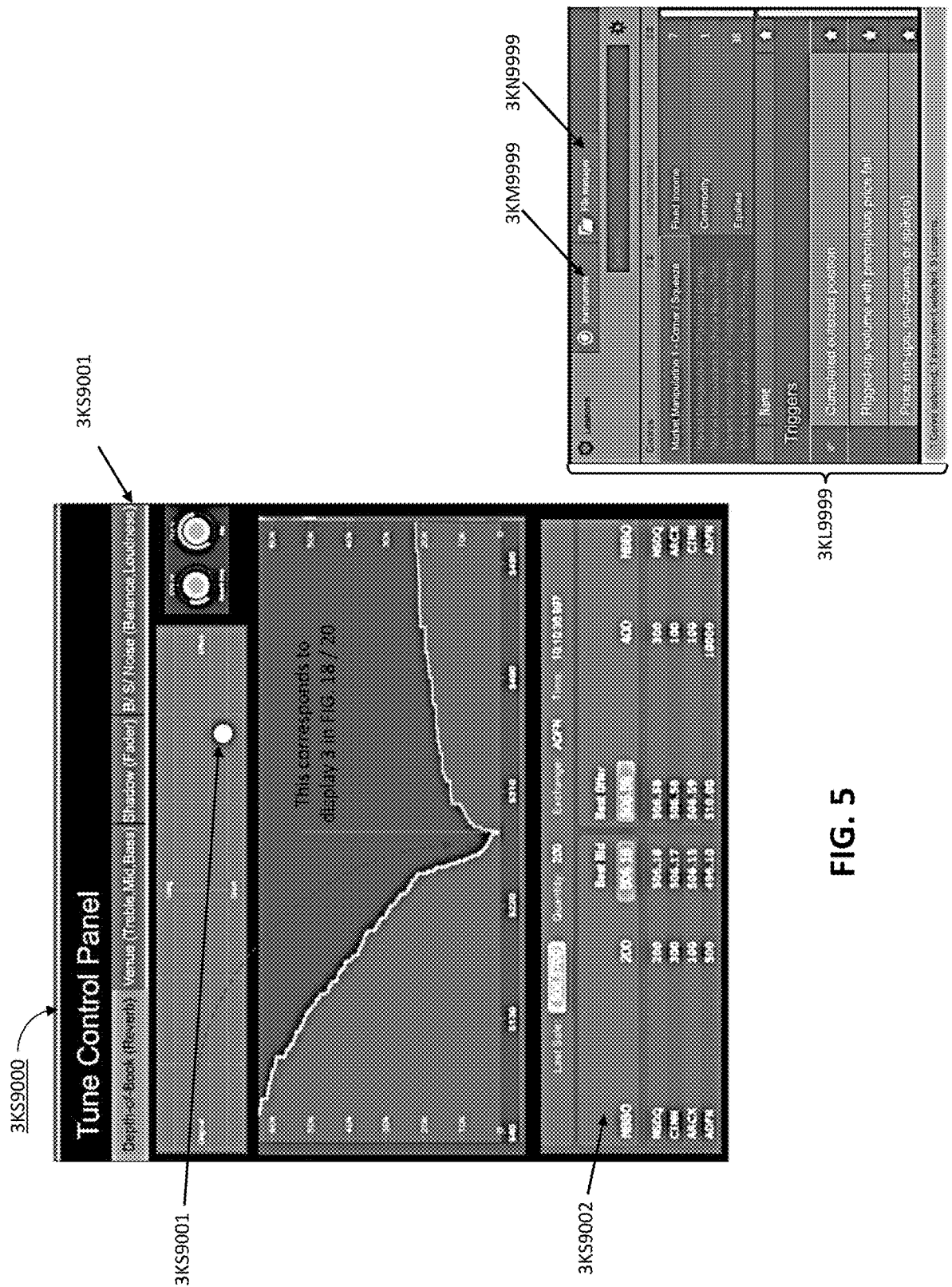
FIG. 5 illustrates an example user interface or window panels with various tabs of tuning controls for market dynamics assimilation and depth-of-book replication.

FIG. 5 illustrates an example user interface or window panels 3KS9000 with various tabs of tuning controls for market dynamics assimilation and depth-of-book replication. In some embodiments, the user interface 3KS9000 is part of the trade reconstruction component 3AX1206 and the order book replay simulator 3BX0415, used with the data transform composer 1AX1101 and the sequencer 1BX1101 to assimilate market dynamics and replicate the depth-of-book and other market interactions by mixing and tuning different 'effects'. Conventional approaches rely on queries of internal databases to hopefully find outlier data points, or human "eyeball checking" of comparable graphs and charts, which leads to inaccurate and subjective results. In contrast, the trade reconstruction component 3AX1206 and the order book replay simulator 3BX0415 provide a highly configurable manner of assimilating different market environments and 'what-if' scenarios. As illustrated in FIG. 5, the user interface 3KS9000 includes a tune control panel, which includes a long/short and original/effect tuning function 3KS9001 representing the relative strengths in bid/ask price and altering steepness of the price curve. Also, a default view 3KS9002 showing a national best bid and offer (NBBO), where a "double-click" of a mouse expands the display to include the BBO and details of a particular venue. The tune control panel 3KS9000 further includes tabs 3KS9001 showing other tuning effects, such as: treble, mid, bass representing activities of ATS (dark pools), systematic internalizers (SIs), and exchanges; fader representing relative activities or interactions between banking sector versus shadow banking; and obfuscate by boosting the loudness, simulate the relative activities or interactions between buy/sell-side by tuning the left/right balance. The user interface 3KS9000 further includes a simulator 3KL9999, which includes an instruments sampler 3KM9999 for tradable objects (e.g. equity, fixed income, commodity, etc.), triggers and genres of lessons, such as market manipulation and synthetically created trades, which are described further below with reference to FIGS. 9-11 and 17.

Using the user interface 3KS9000 illustrated in FIG. 5, the data is obfuscated by boosting the loudness to introduce background noise. In this exemplary embodiment, the data is not altered per se, instead, the 'loudness' distorts the dynamic range, linearity, frequency response in order to 'mask' data signals under the guise of noise frequencies. By making the data incompatible, depth-of-book and trade volume details would not be as transparent, while the best bid-and-offer pricing information remains unchanged. Other obfuscation techniques can also be used, including, but not limited to: 'introduction of random noise' (mashup newly generated noise data to existing good data) and 'separate and scramble' to make it more complicated to decipher details via over simplify the data (e.g. remove trading desk data field) or aggregate at a rollup level (e.g. market wide trade statistics rather than traceable to individual firm's trade strategy). To reverse the obfuscation, either the one who obfuscated the information shares the technique used or trial and error or reverse engineering methods are applied. Noises or randomness can also be introduced using the tuning function of the order book replay simulator 3BX0415 to resist pattern recognition techniques. Referring to FIG. 3, the information in the data can be separated using a decompose and parse feature and scrambling the signal using the simulator 3BX0415 to increase the difficulty of theft of the data. Alternatively, information can be aggregated via the aggregation function to simplify the contents; hence lower dimension information is hidden. Any combination of these obfuscation techniques can be used according to security protection requirements.

Returning to FIG. 3, at block 1CA9999, the compression component 1CX9999 compresses the data stream at a compression ratio that provides a compression rate greater than the data storage rate. Any variety of non-compressed or compressed file formats may be used, including, but not limited to: Pulse-Code Modulation (PCM); Waveform Audio (WAV), Audio Interchange File Format (AIFF); MPEG-1 Audio Layer 3 (MP3); Advanced Audio Coding (AAC); Free Lossless Audio Codec (FLAC); and Apple Lossless Audio Codec (ALAC). In some embodiments, a sending entity, such as an electronic exchange 5XX9999 (see FIG. 1), or an entity in communication with the exchange 5XX9999, leverages audio codecs in the compression and encryption.

At block 1DB9999, the information security component 1DX9999 encodes and encrypts the compressed data with time-locked audio codecs. Time lock encryption is a method to encrypt data such that it can only be decrypted after a certain deadline has passed. To promote the fair availability of market data 5XA0131 to market participants, time lock encryption prevents the protected data from being decrypted prematurely. In an exemplary embodiment, only a decryption key is required to access the data. An independent time-aware trusted third-party (TTP), such as NIST atomic clock, can be used. A sender of the encrypted data uses secret sharing to split the key between the data receiver and the TTP. In secret sharing, each member of a group is allocated a share of the key. The key can only be reconstructed when a sufficient number of shares are combined together. Individual shares are of no use on their own. The TTP also receives a representation of when the contents can be decrypted. For decryption, the receiver contacts the TTP, and the two parties use secure multi-party computation to generate the decryption key. In secure multi-party computation, the receiver and TTP jointly compute a function over their inputs (their share of the key) while keeping those inputs private. The multi-party computation can include an embedded current time value and the representation of when the contents are allowed to be decrypted. The benefits of the time lock encryption include: (a) the receiver will already have the encrypted contents and TTP doesn't have to store it; (b) the entirety of the decryption key is not released to any single entity, thus the theft from one entity does not compromise the key; and (c) the decryption time could be kept private even from the TTP, if needed. To avoid reuse of the decryption key, new keys and new time limits can be refreshed periodically. Also, eradication techniques (e.g. overwriting data that aims to completely destroy all electronic data residing on a digital media) can be used to remove data as soon as it has been transmitted or used.

At block 1EA1304, the outputs and storage management component 1EX1304 stores the encrypted and compressed data. In an exemplary embodiment, the data is stored in a designated top tier parallel file system 0XK1304 or in a tier 2 storage 0XL1304 with periodic separating and purging of archived data in the disaster recovery archive library 0XM1304 (see FIG. 2) according to data loss prevention and business continuity planning policies and available budget. Data loss prevention (DLP) refers to software products which allow administrators to use business rules to classify and protect confidential and critical information so that unauthorized end users cannot accidentally or maliciously share data. Business continuity planning is the process of creating systems of prevention and recovery to deal with potential threats. Optionally, the encrypted and compressed data can be streamed via some protocols or gateways to another system or a third party system (block 1EB9999).

In block 1EC9999, the external access format and other requirements for the encryption and compressed data are validated. Example formats include, but are not limited to: JSON; CVS; or XML. In block 1AB9999, the data can be converted between music notes, metrical trees representation, traditional financial data format, or other desirable formats, if needed, before compression. The encrypted and compressed data can then be shared (block 1ED9999).

In block 1EE9999, when data is received from a third party, the data is decrypted with the audio codec by the information security component 1DX9999 (block 1DC9999) and decompressed by the compression component 1CX9999 (block 1CB9999).

Figure 18:
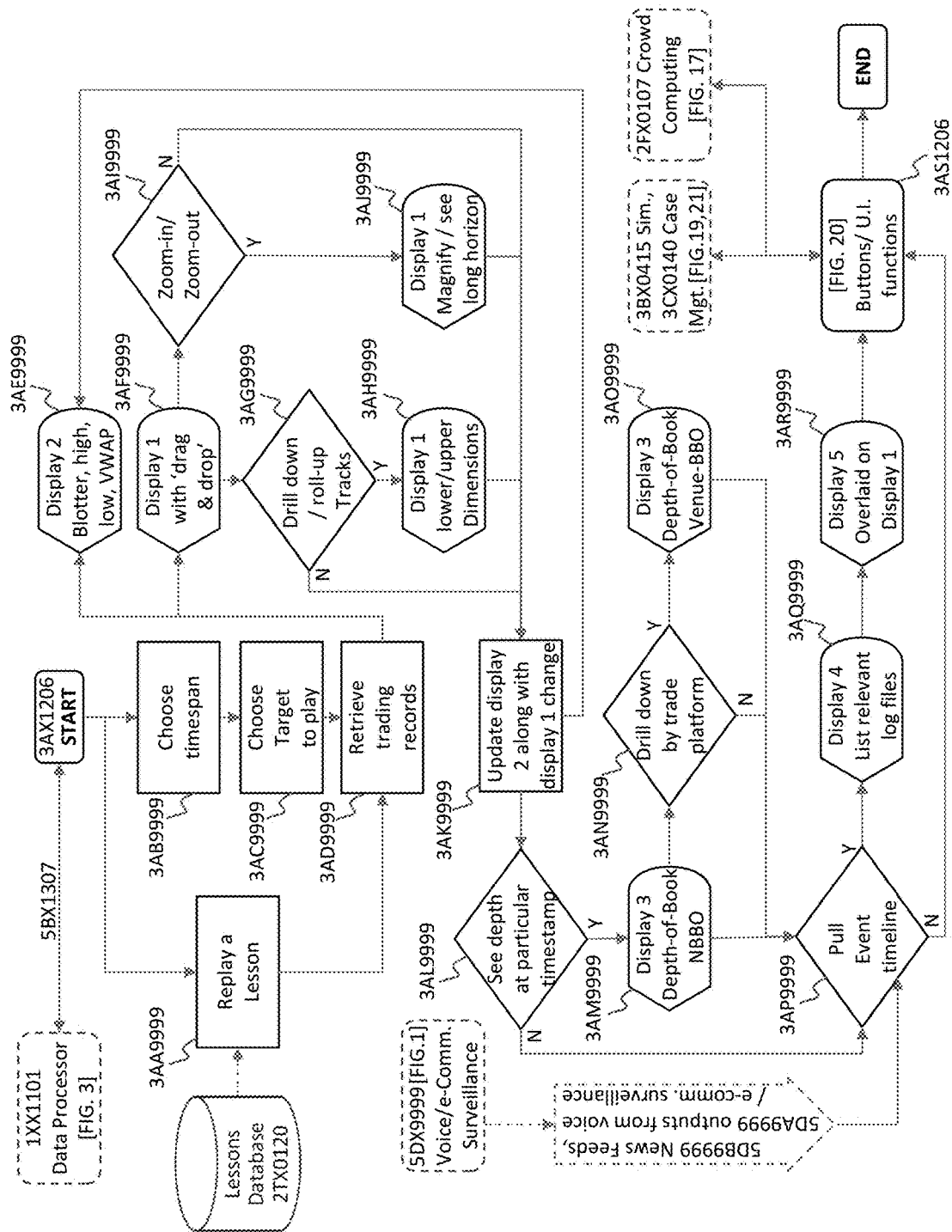
FIG. 18 is a flowchart illustrating a method for reconstructing a trade event, implemented by the trade reconstruction component of the review system, according to some embodiments.

In block 1AC9999, links of relevant reference data 5XB0131, outputs from voice and e-communications 5DA9999, news feeds 5DB9999, and other market events records are tagged when pulling event timelines during the trade reconstruction process (block 3AX1206), described further below with reference to FIG. 18. This data is tagged with the corresponding trade order stream 4AA0130 or market maker's pricing records 4CX9999 in the same time span, as appropriate.

Analytical System

Figure 7:
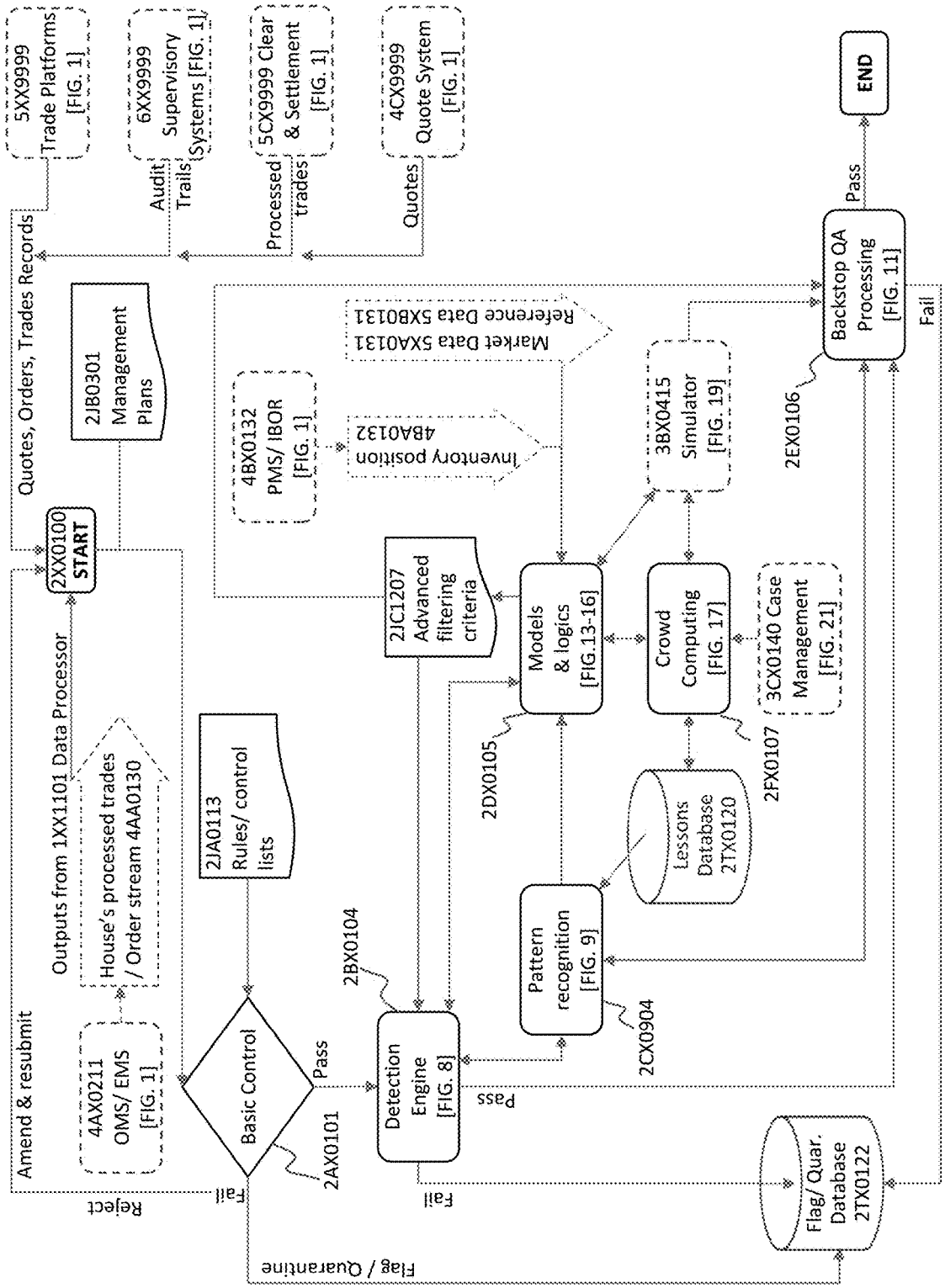
FIG. 7 is a flowchart illustrating a method for providing trade analytics, implemented by the analytical system, according to some embodiments.

FIG. 7 illustrates a method for providing trade analytics, implemented by the analytical system 2XX100, according to some embodiments. The analytical system 2XX100 receives the outputs from the data processor 1XX1101. Alternatively, the analytical system 2XX100 receives the trade order stream 4AA0130 and reference data 5XB0131 directly from the OMS/EMS 4AX0211. Alternatively, the analytical system 2XX100 receives the quotes, orders, and trades information from the market maker's pricing/quoting systems 4CX9999 that can be used as a substitute to the trade order stream 4AA0130 from the OMS/EMS 4AX0211. Other sources of input data can be used as a substitute to the trade order stream 4AA0130 include, but not be limited to data resided at: the SEC's Market Information Data Analytics System (MIDAS) 6XX9999 or the FINRA's "Order Audit Trail System" (OATS) or the Consolidated Audit Trail (CAT) system, self-regulatory organizations (SROs) or other trade platform, for example, the NYSE or NASDAQ Stock Exchange 5XX9999; and clearing house's systems, for example, DTCC (5CX9999).

In block 2AX0101, the basic control process 2AX0101 reviews the trade orders against a control list or predefined rules 2JA0113. In some embodiments, the control lists or predefined rules 2JA0113 are desk or trader specific. For example, the management policy 2JB0301 may prohibit certain order types, leverage, or derivatives depending on a trading desk's nature or the trade limits set for different traders. When a control violation is found, the basic control process 2AX0101 either rejects the trade order or the trade is flagged or quarantined and stored in the flag/quarantine database 2TX0122.

In block 2BX0104, for the trade orders which pass the basic control process, the detection engine 2BX0104 examines the trade orders to determine which series of trade orders or processed trades match patterns of irregularities, which may indicate potential market manipulation, or other onset signals stored in the lesson database 2TX0120. When trades match patterns of irregularities, the detection engine 2BX0104 flags the matters in flag/quarantine database 2TX0122 for management actions. In block 2DX0105, the detection engine 2BX0104 further applies more rigorous checks or filtering processes using the models and logics component 2DX0105 and advanced filtering criteria 2JC1207. Hence, the detection engine 2BX0104 applies a hybrid approach which combines the use of preconfigured detection algorithms and pattern recognition techniques to provide effective detection and identification of abnormal or undesirable trade activities (e.g. conflict of interest with clients).

Figure 8:
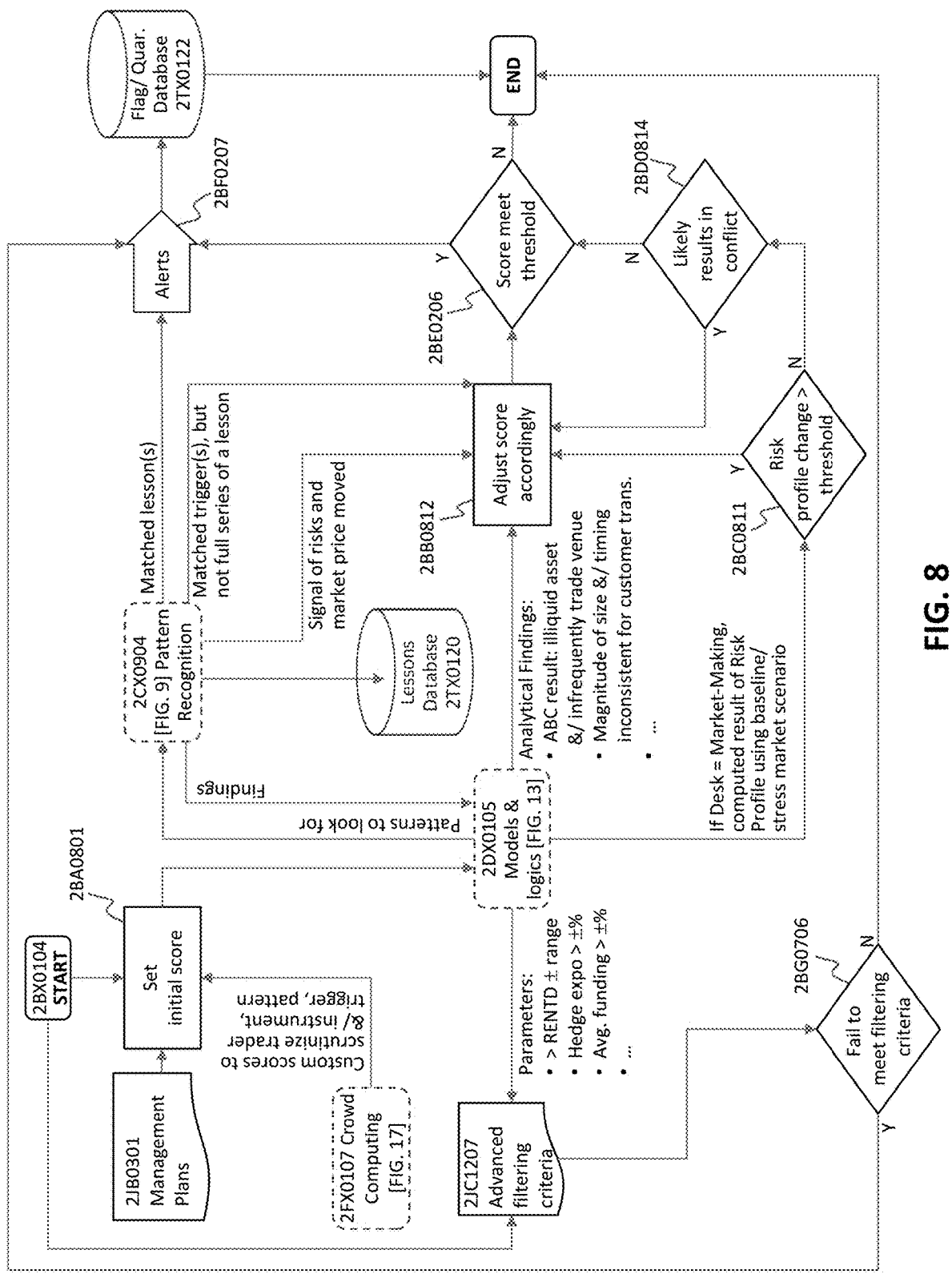
FIG. 8 is a flowchart illustrating in more detail the analytics performed by the detection engine according to some embodiments.

FIG. 8 illustrates in more detail the analytics performed by the detection engine 2BX0104 according to some embodiments. At block 2BA0801, the detection engine 2BX0104 sets the initial score for the trade order at the beginning of the process implemented by the detection engine 2BX0104. The initial score is set according to the management plans 2JB0301, particular the risk appetite statement. The initial score can be customized for particular trading desks(s) and/or trading group(s) in order to reflect, for example, different risk exposures for different trading operations. The initial score can be adjusted by using the scrutinize-as-fit method, as described further below with reference to FIG. 17. The scrutinize-as-fit method puts things into context and ensures fit-for-purpose to tighten or relax the respective controls (e.g. order is initiated by a trader on the scrutinize traders list, or different market environments, nature of trades with clients or counterparties, characteristics of trade instruments, risks, liquidity conditions, and inventory portfolio consideration factors). Various parameters in the advanced filtering criteria 2JC1207 that the detection engine 2BX0104 uses to compare against may be configured via the customization process, described further below with reference to FIG. 17. In block 2BE0206, trade activities with scores meeting a configured threshold may be deemed to be normal or desirable (or reasonable in the context of Volcker compliance). Those trade activities with scores that fail to meet the configured threshold may be deemed trade irregularities or undesirable (or not meeting particular exemption criteria in the context of Volcker compliance) and be flagged or quarantined in the flag/quarantine database 2TX0122.

The detection engine 2BX0104 leverages computation results from models and logics 2DX0105 to objectively perform multiple rule-based processes in parallel. Through the review of factors, such as the frequency in trading certain products at certain venues, a score for a trading order being processed is skewed to reflect either a higher or lower likelihood of irregularities. When the trade is not a frequently traded instrument or venue for the trading desk 4DX0505, the models and logics component 2CX0105, described further below, are used to perform an ABC analysis (block 2DD0805) lookup to identify the value category for the trade. In block 2BB0812, the score is adjusted accordingly, considering any updated filtering criteria 2JC1207, to reflect the higher likelihood of that the trade should be flagged or quarantined. An ABC analysis is an analysis of a range of items that have different levels of significance and should be handled or controlled differently. Most frequent trade instruments and venues are assigned the highest value, while the least trade instrument and venues are assigned the lowest value.

The detection engine 2BX0104 determines if market making or underwriting trade orders may cause the running inventory figure to exceed Reasonable Expected Near-Term Demand (RENTD) forecast or determines if risk mitigating hedges exceed hedge exposure limits or treasury trades exceed funding need for liquidity management inventory plan. The RENTD and the inventory plan are computed in order to set boundaries to consider if trade activities may be outside the 'reasonable' range and/or market-time. RENTD and the inventory plan are further described below with reference to FIGS. 15 and 16. If the trade order would cause an excess over the limit or timing irregularity, then the detection engine 2BX0104 determines whether the trade activity is associated with a sudden market disruption (e.g. rapid market decline as calculated by some frameworks and algorithms). That excess during sudden market disruption may qualify for exemption under the Volcker Rule, if the trade meets certain risk mitigating hedge exemption requirements. If there has not been a sudden market disruption, then that particular trade may be considered as risky proprietary trade warrants appropriate skewing of the score (block 2BB0812) to be flagged or quarantined for management action Also, if a non-customer transaction short sells in anticipation of customer sell orders, this can cause unnecessary risk exposure to a bank. Hence, the score should be appropriately adjusted. If the trade does not exceed the limit, then the detection engine 2BX0104 determines whether the trade is beyond the life of the hedge (i.e., the duration of the hedge protection, described further below with reference to FIG. 16), which is yet another trigger of concern that the beyond life of hedge trade activity should be flagged or quarantine for management action.

In an exemplary embodiment, when the trade is not a customer transaction, and when the risks and market price moved per a pattern recognition process, the score is adjusted accordingly (block 2BB0812) based on the magnitude of the movement, where the larger the movement, the higher the likelihood that the trade order should be a concern for flag or quarantine. "Market price moved" refers to an act that creates a buy or sell-momentum effect in the market. Risk measurements per the framework and algorithms may be used to gauge a market situation, so that entities may change hedging instruments or quantity in order to adjust to the movements. Regardless of whether the trade is a customer transaction, when the trade order is likely to result in a disproportionally large daily trading volume with a non-customer, score is adjusted based on the magnitude of the disproportion (block 2BB0812), where the larger the disproportion, the higher the likelihood of a potential conflict with customer (block 2BD0814).

In another embodiment, through the review of factors, such as agency trade on behalf of customers while the trade size or trade timing being inconsistent, a score for a trading order being processed is skewed (block 2BB0812), where the larger the deviation, the higher it is suspicious that it may allegedly be front-running or other unethical behaviors if other symptoms are presented. These symptoms include, but not limited to, flipping the switch of a 'client' account to a 'counterparty' when a bank wants to escape fiduciary responsibility, then flipping the switch back to 'client' in order to qualify for some exemptions in fending off regulatory scrutiny. Another symptom could be significant change in the market maker's risk profile per computation by models and logics component 2DX0105 (i.e., the risk characteristics of the positions taken in the context of the type of market making) being beyond certain threshold (block 2BC0811). The score is adjusted based on magnitude of the change (block 2BB0812).

In another embodiment, when the trade is related to risk mitigating hedge, the detection engine 2BX0104 determines whether the trade is to buy Credit Default Swap (CDS), yet the house's inventory position 4BA0132 (from portfolio management system (PMS) or investment book of records (IBOR) 4BX0132 indicates that the firm does not hold any related position (i.e. buying a CDS "naked", which is a high risk proprietary bet). The purpose of a CDS is for hedge protection. However, there would be nothing to protect against if the firm does not hold any related position. Thus, naked CDS would not be qualified for risk mitigating hedge exemption requirements under the Volcker Rule, or the risky nature of such trade activity warrants appropriate skewing of the score to generate an alert or escalate the matter (block 2BB0812).

In another embodiment, when the trade is related to underwriting, the detection engine (block 2BG0706) determines whether the trade is a bond swap, an option, a short sell, or whether the trade activity is beyond underwriting period of the respective underwriting lot, or the bank is a syndicate member of the respective underwriting lot. When the trade is a bond swap, the trade may only be qualified under market making exemption, but not satisfying Volcker's underwriting exemption requirements. When the trade order is an option and it is placed during a falling market, the trade may only be qualified under the risk mitigating hedge exemption instead of the Volcker's underwriting exemption. When the trade is a short sell, the detection engine 2BX0104 examines the underwriting log-book 2DB0421 (see FIG. 15) to determine if there may be a price restriction for the specific underwriting lot. If the short sell order is placed during a falling market, then the trade may only be qualified as a risk mitigating hedge exemption instead of the Volcker's underwriting exemption. If the trade order is beyond the underwriting period that remarks in the underwriting log-book 2DB0421, and if the bank is not a syndicate member of the respective underwriting lot but exceeded the non-member threshold as set by the relevant underwriting agreement, then the trade order fails to meet the parameters and warrants the skewing of the score (block 2BB0812), which may lead to the generation of an alert (block 2BF0207) or the escalation of the matter.

In another embodiment, 'toxicity or profit analyzers' may be implemented in conjunction with the scoring and filtering approach according to embodiments of the present invention to holistically track and respond to "toxic" order flow. A toxic order flow occurs in scenarios where trade would result in expected losses larger than a threshold or worsen a maximum draw-down rate or Sharpe ratio. The mechanism for onset detection, modeling of investment strategies, and the ability to generate timely and meaningful alerts can also be directed to trade analytics for monitoring market liquidity, best execution, or in pursuit of alpha opportunities. Embodiments of the detection engine 2BX0104 are not driven only by a set of pre-defined rules. Instead, the detection engine 2BX0104 uses a hybrid approach involving both a set of rules and a pattern recognition process to identify irregular trading activities.

Figure 9:
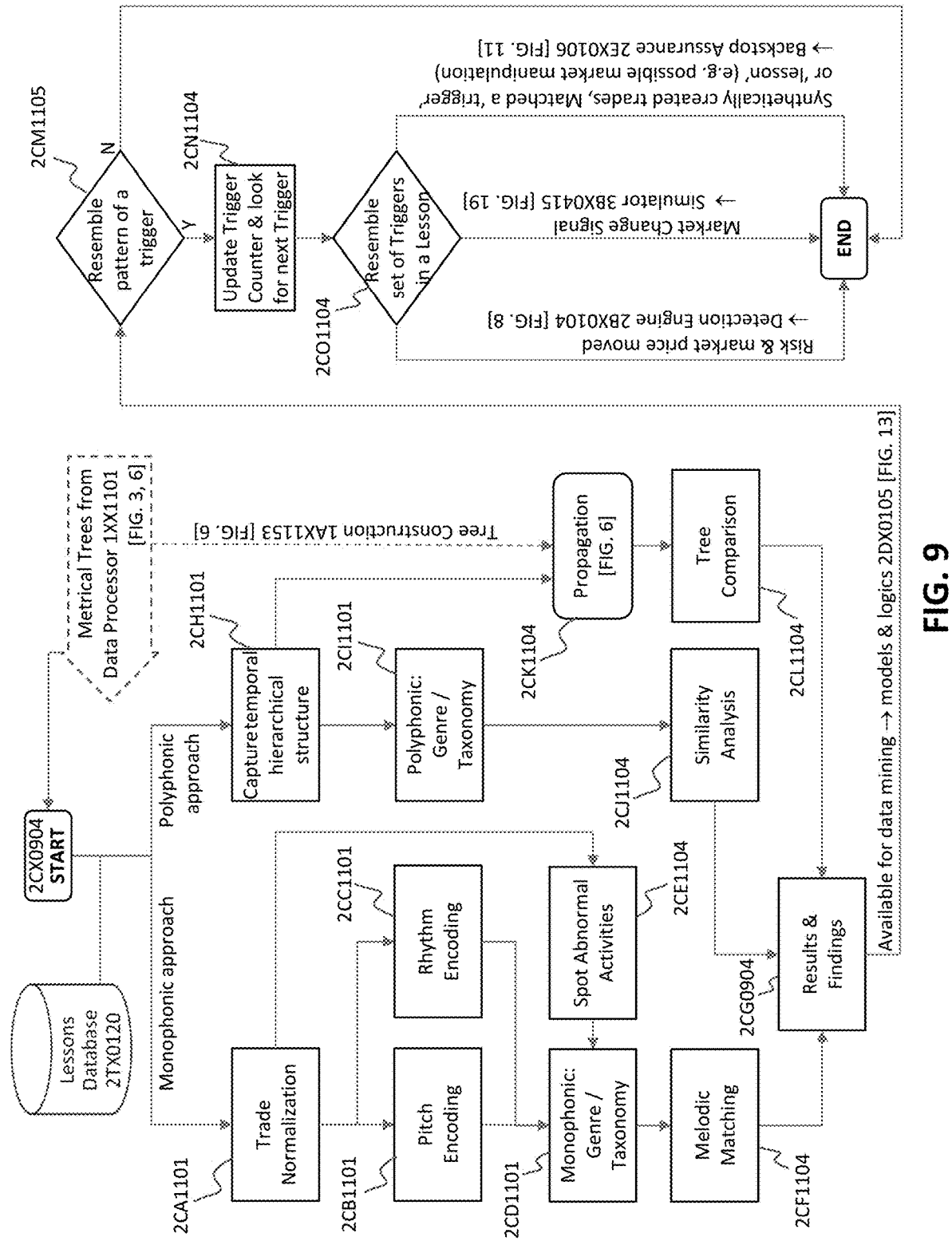
FIG. 9 is a flowchart illustrating a pattern recognition process to compare trade order data and/or processed trades with complex event processing (CEP) lessons according to some embodiments.

FIG. 9 illustrates a pattern recognition process to compare trade order data or processed trades with complex event processing (CEP) lessons according to some embodiments. As trade patterns are converted to metrical trees by the data processor 1XX1101, the trade reconstruction component 3AX1206 of the review system 3XX0140 sets up corpora or CEP lessons, which are then stored in the lessons database 2TX0120, described further below with reference to FIG. 18. Market manipulation often involves a series of trades rather than a single trade. It involves deceptive price movements or the appearance of market force(s) on an instrument, from which profit is then unfairly realized from the trading of the instrument in a direction opposite to the created false or misleading market environment, which may be a prohibited act under U.S. or international securities regulations. Deceptive market manipulation typically comprises characteristics resembling a mix of, but not limited to, the following 'triggers':

(a) continuous alpha trade with large accumulated losses;
(b) unusual trade volume (rigged-up volume with precipitous price fall);
(c) inexplicable price run-ups, run-downs, or spike(s);
(d) suspicious mark price near time of market close;
(e) trade style inconsistency with quick reversal of direction;
(f) frequent buy and/or sell among the bank holding company (BHC) or affiliates;
(g) dealing with concentrated group of dealers;
(h) suspicious price speculation on or around an initial public offering (IPO) date;
(i) infrequent trade small-cap asset irregular activities (for small-cap securities where volumes are typically not high, a sudden large number of shares being traded may be a sign of market manipulation);
(j) cumulated outsized positions with size that is greater than a configured percentage of supply;
(k) dominated long position with series of heavy sell orders;
(l) off-load substantial poor performing asset to retail;
(m) retail rarely squared-off their pumped positions;
(n) erosion of market liquidity with raising of perceived liquidity;
(o) suspicious off-street financing corner with a squeeze;
(p) flooding of market with devalued collaterals;
(q) wave of margin calls in case of a sell-off;
(r) suspicious set price using long call with synthetic call;
(s) trading glitch with algorithm deploy error or control being off;
(t) risk, volatility and/or market prices moved with destabilization;
(u) tight two-way price quotes with wave of cancelled trades;
(v) substantial orders placed with quote amendments.

Any single 'trigger' listed above may not be a violation. However, the legitimacy of trade activities may be challenged if they occur in an order resembling a set of triggers in the lessons database 2BX1104, examples of which are set forth in Table 1, illustrated in FIG. 10.

As illustrated in FIG. 10, the segmentation and grouping of trade styles or patterns helps to expedite the comparison process in the comparative analysis, described below, by avoiding the need to compare against all of the lessons in the lessons database 2TX0120. The segmentation and grouping of trade styles or patterns can also be representing market change signals, suitable for use in reconfiguring, customizing, and updating the control lists 2JA0113 and advanced filtering criteria 2JC1201. Historical cases can be used as CEP lessons stored in the lessons database 2TX0120 to train the analytical system 2XX0100 through the crowd computing component (block 2FX0107), as described further below, to improve the ability of the detection engine 2BX0104 to recognize the symptoms of market manipulation, market change signal, synthetically created trades, or likelihood that the set of trade activities will result in a market price move of one or more financial assets against plans, or other signals.

Referring to FIG. 9, a matching process is performed, which compares the 'tracks' with the 'triggers' stored in the lesson database 2TX0120. When the pattern of the tracks resembles the pattern of a trigger (block 2CM1105), a trigger counter is updated (block 2CN1104). The score for the trade order is adjusted as a fit for this trigger. The trade order can then be scrutinized as needed by the crowd computing component 2FX0107. It is also determined whether the tracks resemble a set of triggers in the lessons database 2TX0120 (block 2CO1104). If so, it is determined whether the resemblance indicates a market change signal (described further below with reference to FIG. 19), or signifies a risk and market price moved for the earlier described detection engine process (FIG. 8), or recognizes as synthetically created trades (described further below with reference to FIG. 11).

A monophonic approach, a polyphonic approach, or a combination of monophonic and polyphonic approaches can be used to compare the trade data with the lessons database 2TX0120. Regarding the monophonic approach, the pattern recognition component 2CX0904 performs a trade normalization process (block 2CA1101), where the trade data is parsed into the lowest dimension and segregated. For example, any canceled trades and bid/ask orders are parsed and segregated into 'tracks'. Then, the pitch and rhythm are encoded (blocks 2CB1101 and 2CC1101) using the tuning function of the data transform composer 1AX1101 and spotting any abnormal activities in 'solo' mode (see FIG. 4) (block 2CE1104). Simpler patterns, such as the payoff curves illustrated in FIG. 12, may be stripped from the 'tracks' and 'triggers' (block 2CD1101). The melodic matching process (block 2CF1104) compares the stripped out 'tracks' with 'triggers' stored in the lesson database 2TX0120. These 'triggers' can be simple payoff patterns of a long, short, covered call, protective put, butterfly, or strangle (see FIG. 12). Although, the monophonic approach is relatively slow compared to the polyphonic approach, the monophonic approach allows more details to be shown as proofs. Also, the 'triggers' help to form the basis upon which to determine if a combination of trades may become synthetically created trades, which are reviewed by the backstop assurance component 2EX0106.

Regarding the polyphonic approach, the pattern recognition component 2CX0904 captures the temporal and hierarchical structure when converting trade information into metrical trees using the data transform composer 1AX1101 (block 2CH1101). When the same genres cases are over a configured threshold (block 2CI1101), then the cases are denoted as 'systemic'. Machine-learning methods may be used in a similarity analysis (block 2CJ1104) to look for similarities between trade data and 'polyphonic' triggers or lessons in the lessons database 2TX0120. Such similarity analysis is quicker than conventional approaches, partly due to the smaller size of the metrical tree structure, thus saving processing and other computing resources. The accuracy of the similarity analysis depends partly on the quality of the polyphonic triggers or lessons. Thus, the training set can be configured to minimize over-fit or under-fit of the model. Alternatively, once the metrical trees are constructed (block 1AA1153, see FIG. 6), a comparison (block 2CL1104) can be performed using a propagation or partially labelled tree approach (block 2CK1104) that gives more emphasis to the information hierarchically contained in the tree than to the tree structure. In some embodiments, the partially labelled tree approach encompasses: (1) compute the average of chances of finding a labelled leaf in the descendant of a non-labelled inner node; (2) compute recursively until no match of trade activities/metrical tree similar to a trigger stored in the lesson database 2TX0120 is found within the corresponding time span (i.e. no match, hence passing the pattern recognition 2CX0904 checkpoint); (3) measure distances between the metrical tree with other metrical trees in the lessons stored in the lesson database 2TX0120 using a nearest neighbor rule; (4) organize lessons in lesson database into genres (with reference to the later described FIG. 17) and use a trigger counter 2CN1104 to identify a set of possible matching lessons; and using the distances, genres, and trigger counter, identify lessons that match the metrical tree. The trigger counter is used to identify a subset of the lessons which may match the metrical tree, where subsequent comparisons are performed only for the subset. For example, referring to Table 1, when the trigger 'j' is matched, the trigger counter for 'j' is updated. The matching process is able to determine from the updated trigger counter for 'j' that the lessons (i) and (vi) are possible matches while the others are not. The matching process then proceeds to only compare the subset of lessons and foregoing comparisons with the remaining lessons, thus optimizing the matching process. The score for the trade activity is adjusted with increasing weight with each match to a trigger in a lesson. For example, referring again to Table 1, the score is adjusted in response to a match to trigger 'b' in lesson (i). As the matching process subsequently matches trigger 'e', 'n', and 'o', the score is adjusted in increasing weights, i.e., reflect increasing likelihood of trade irregularities, where the match of 'o' has the most weight.

The partially labelled tree comparison algorithm is based on the assumption that the match value between a labelled leaf and a non-labelled inner node should be the average of chances of finding that leaf in the descendants of that inner node. This comparing method omits the accounting of the insertion or deletion of nodes and just measures the chance of finding coincident labels, which gives more importance to the information hierarchically contained in the tree than to the tree structure. In this exemplary embodiment, when considering two trade sequences playing at different tempos, perfecting the clock synchronization is analogous to aligning and altering the two tracks to the same tempo before measuring the similarities. The two tracks can have the same tempo, for example, 'long, long, short, long, short, short' structural connections or relative distances across levels in temporal hierarchical structure. Thus, a 'jiggling' process to insert or deletion of nodes in a fully labelled tree only matters to the 'tree structure' (i.e. 'shape' of the plotted charts that 'technical analysis' rely on, and in turn causes much inaccuracy when measuring vectors graphically—e.g.

change in shape would affect the degree angle of a linear vector), but fails to measure or 'emphasize' the information 'hierarchically'. For 'partial labelled tree' approach, the match values are considered as distances and, following a nearest neighbor rule, the melody classification of trade activities closest to the query is taken as the corpus lessons stored in the lessons database 2TX0120. This leads to more accurate results and findings than conventional methods (block 2CG0904), with fewer errors and greater clock synchronization tolerance. The analysis is also performed faster than conventional methods, further saving processing and other computing resources.

In some embodiments, the choice between monophonic and polyphonic approaches is selected manually by users. In other embodiments, the selection is performed automatically, without user intervention, where the approach with the quickest paths and fewest errors for the use cases and the appropriate fit-for-purpose are selected, as described further below with reference to FIG. 17.

Figure 11:
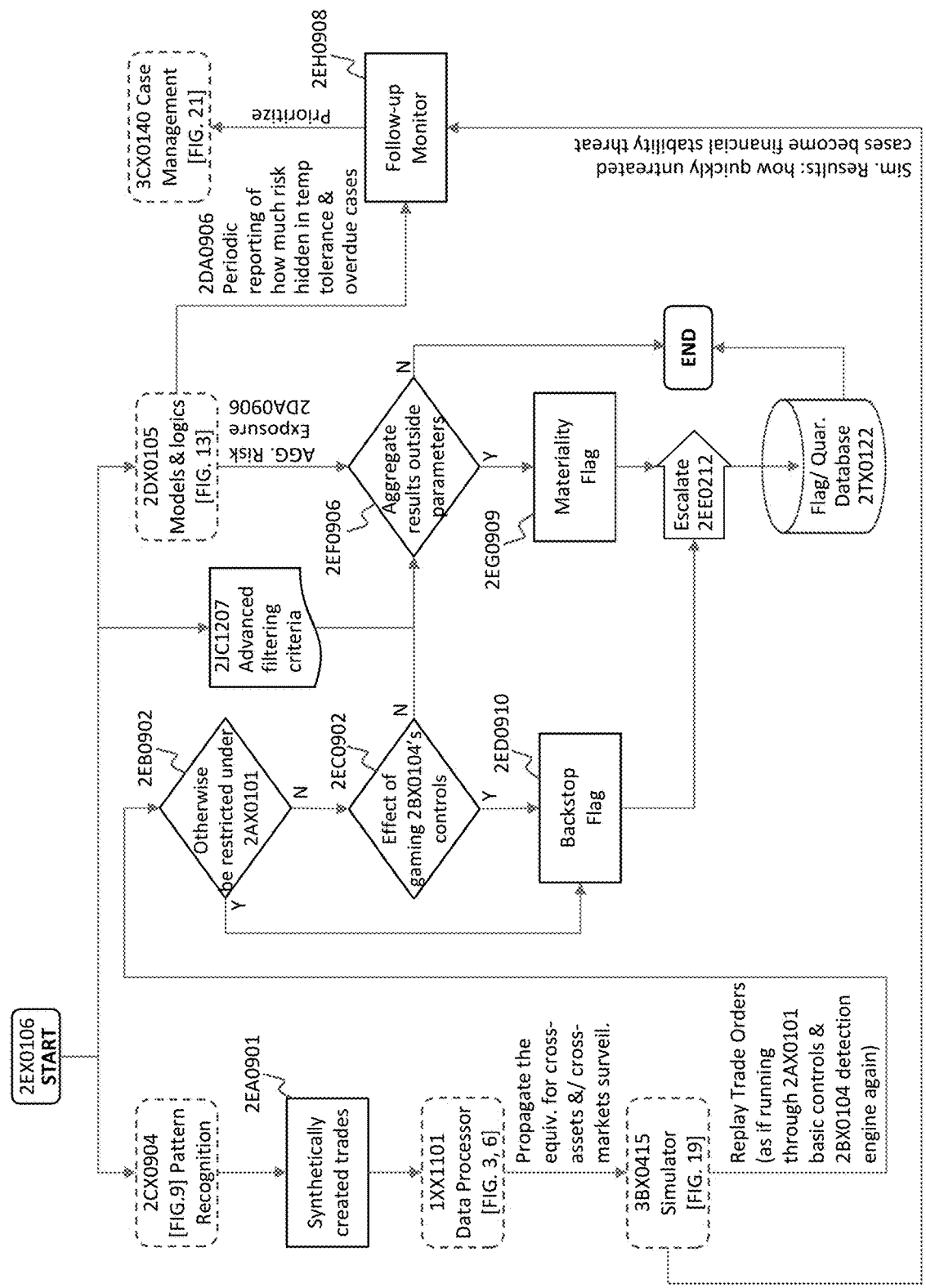
FIG. 11 is a flowchart illustrating a process implemented by the backstop assurance component according to some embodiments.

FIG. 11 illustrates a process implemented by the backstop assurance component 2EX0106 according to some embodiments. The backstop assurance component 2EX0106 performs gatekeeping trade activities that were undetected by the basic control component 2AX0101 and the detection engine 2BX0104, but which posts material risk or significant irregularities, such as synthetically created trades to bypass controls or potential implications resulting from lack of actions towards temporary tolerance or overdue cases.

The backstop assurance component 2EX0106 performs multiple processes to reexamine the trades in parallel. In a first process, using outputs from the models and logics component 2DX0105, the backstop assurance component 2EX0106 determines whether the aggregate risks match any predetermined criteria 2DA0906, i.e., results in "outside parameter" situation (block 2EF0906). If the aggregate risks do not match any of the predetermined criteria, then the backstop assurance component 2EX0106 determines there is no 'red-flag' based on this criteria. If the aggregate risks match any of the predetermined criteria, then the backstop assurance component 2EX0106 determines that the trade activity results in material exposure, a material conflict of interest, or poses a safety and soundness threat to the entity; and in response, flags the trade as having 'materiality' concern (block 2EG0909). In this exemplary embodiment, the predetermined criteria include, but are not limited to: whether an individual non-bank counterparty exposure exceed a threshold; whether a bank's CET1/Tier 1 capital is within a threshold; whether a related party's exposure is less than a single or connected party's transactions; whether related party transactions or write-off's exceed a threshold; and whether a net exposure on a particular asset class and/or instrument exceeds a threshold. Each of the thresholds listed here may be configured by a user and takes into account the exemption justification associated with the trade order. The models and logics component 2DX0105 keep running figures of these measurements, hence whenever the next trade activities may cause a potential outside parameters situation, the case is escalated (block 2EE0212) for management consideration of possible stop loss or other actions as appropriate. This feature of the invention addresses an industrywide problem that, despite an entity having risk models to identify large exposure, the entity does not have a robust control mechanism to stop losses in time to avoid the consequences of the exposure.

Figure 12:
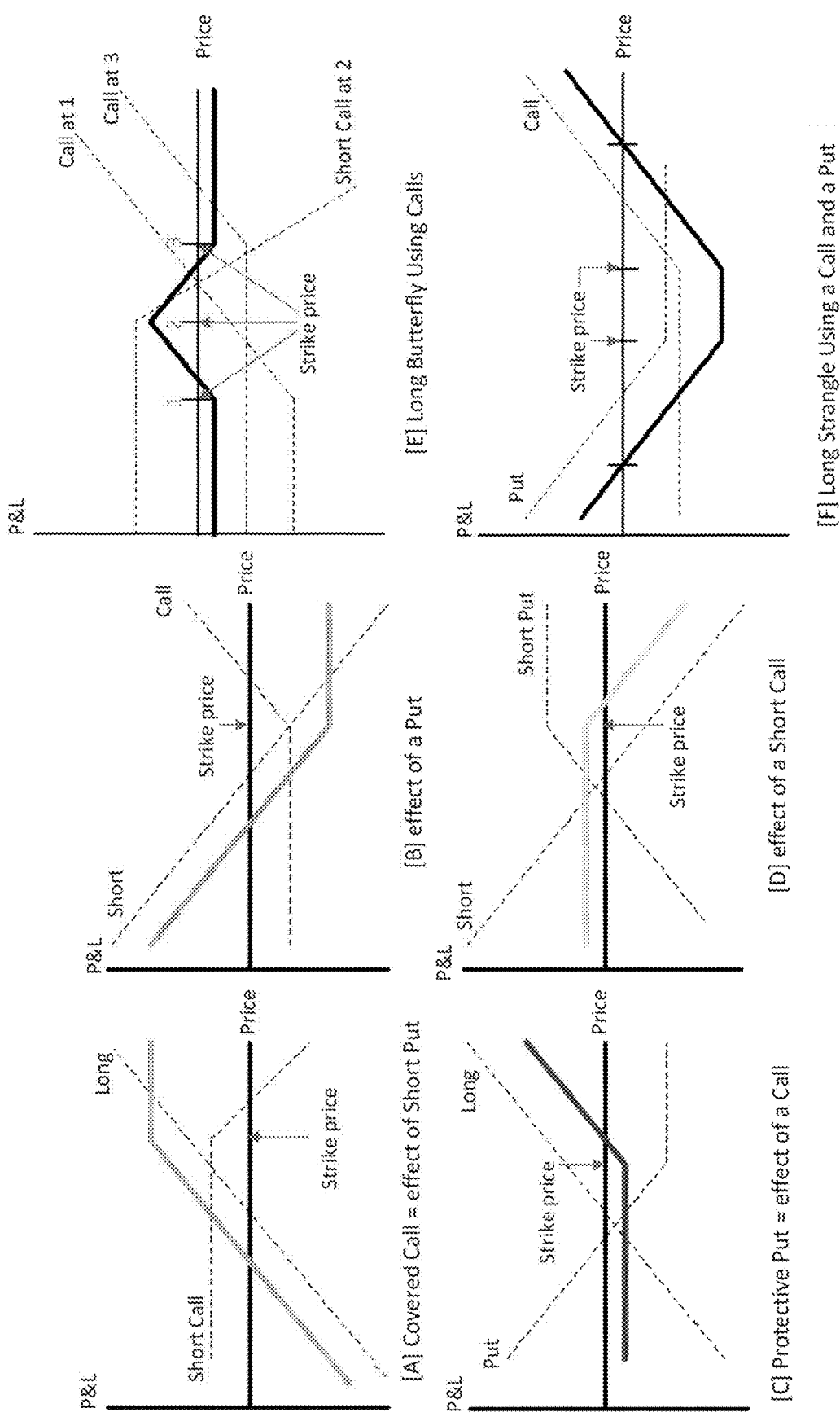
FIG. 12 illustrates examples of the identification of synthetically created trades by the basic control component, according to some embodiments.

In a second process, the backstop assurance component 2EX0106 examines a series of trade activities in corresponding time span identified as synthetically created trades (block 2EA0901) by the pattern recognition process (block 2CX0904) (described above with reference to FIG. 9). FIG. 12 illustrates examples of the identification of synthetically created trades that resemble the payoffs of trade order data or processed trades that may otherwise be restricted by the basic control component 2AX0101, or has the effect of gaming the controls of the detection engine 2BX0104, according to some embodiments. A synthetically created trade is a financial instrument that is created artificially by simulating another instrument with the combined features of a collection of other assets. For example, as illustrated in chart A, if a trader is trying to produce a payoff of a short put for legitimate trade purpose, but put option is not available in the market, the trader may rightfully use financial engineering method to long the securities position and combines it with a corresponding short call option at particular strike price along the same time span to yield the same effect. There are other payoff replications, such as, but not limited to, the typical effect of a Put (chart B), a Call (chart C), a Short Call (chart D), a Butterfly (chart E), or a Strangle (chart F). Charts A through F illustrate the option model, Black-Scholes's Put-Call Parity formula, which is known in the art and is not further described here.

Returning to FIG. 11, when a trade order and the series of recent trade activities are determined to be a synthetically created trade (block 2EA0901), using the hybrid of monophonic and polyphonic partially labelled tree approach (described above with reference to FIGS. 6 and 9) to propagate the equivalent trade patterns. To determine whether the synthetically created trade is being abused, the backstop assurance component 2EX0106 sends the equivalent trade patterns to the basic control component 2AX0101 and the detection engine 2BX0104 for reexamination (block 2EB0902), which determine whether are any effects of gaming the basic control process's controls (block 2EC0902). If there are effects, then the trade order is flagged by the backstop assurance component (block 2ED0910).

For example, assume that a dealer wants a position that will profit if bond prices decline. The dealer simultaneously enters into a reverse repurchase and sale of collateral. The dealer borrows the bond and sells it, and uses the proceeds of the sale to lend into the reverse repurchase. At the end of the term of the repurchase, the dealer's loan is repaid with the agreed upon interest, and the dealer buys the bond back in the open market to deliver into the reverse repurchase agreement. It is due to example activities such as this that pattern recognition is needed on the trade order and a series of trade activities in corresponding time span. If the trade order and a series of trade activities in corresponding time span do not have the effect of a synthetic short sell, then the backstop assurance component 2EX0106 determines whether the trade activities have the effect of a total return swap or synthetic forward. A total return swap involves an agreement in which one party makes payments based on a set rate, while the other party makes payments based on the return of an underlying asset, which is usually an equity index, loans, or bonds. A synthetic forward involves a single investor simultaneously holding both a long call option and a short put option. The trade would be legitimate in the context of Volcker compliance if the trade activities do not have the effect of a total return swap or synthetic forward. If the trade activities do have the effect of a total return swap or synthetic forward, then the effect is input into the basic control component 2AX0101 and the detection engine 2BX0104, which returns a score adjusted to account for the 'effect'.

In a third process, when a temporary tolerance approved for the trade is received via a case management system 3CX0140, the trade is further subjected to follow-up monitoring (block 2E110908), and the aggregate risks are further evaluated to determine whether there continues to be a matter of concern which should be flagged (i.e. gaming of controls) (blocks 2EC0902 and 2EC0910). Temporary tolerance may be granted under certain conditions, such as when an excess has to be squared-off within a certain time frame. The follow-up monitoring verifies that the conditions are properly fulfilled by the set time frame. By closely monitoring and prioritizing the temporary tolerances or overdue un-closed cases in the case management system 3CX0140, the backstop assurance component 2EX0106 assures that the cumulative effects of such tolerances or overdue cases do not inadvertently lead to other problems that may cascade or lead to uncontrollable or difficult to control consequences, or prevents the abuse of the temporary tolerance process to bypass detections. The models and logics component 2DX0105 would periodically keep count and report back how much risk is hidden in temporary tolerance and overdue cases. In turn, trade irregularities are flagged and sent to the case management component 3CX0140 for further processing (block 3CX0140).

Figure 13:
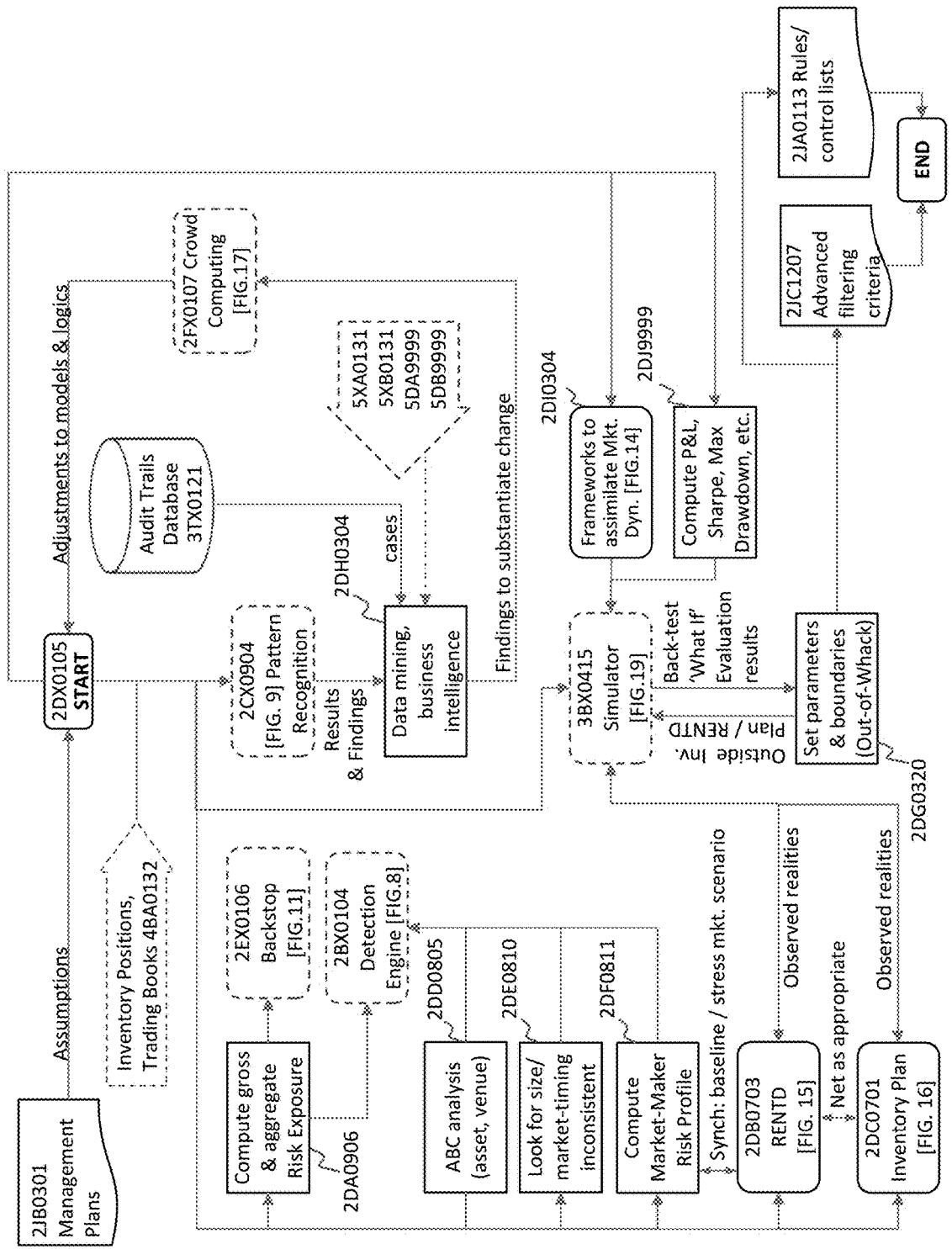
FIG. 13 is a flowchart illustrating a method of computing and defining parameters and boundaries by the models and logics component according to some embodiments.

FIG. 13 illustrates a method of defining parameters and boundaries by the models and logics component 2DX0105 according to some embodiments. The models and logics component 2DX0105 begins with a set of assumptions. In this exemplary embodiment, the assumptions are obtained from the management plans 2JB0301. The assumptions may include, but not be limited to: markets; client/counterparties; instructions; risk; liquidity; and inventory (see FIG. 14). The models and logics component 2DX0105 receives the results and finding from the pattern recognition component 2CX0904. In block 2D110304, the models and logics component 2DX0105 performs data mining of the data from the pattern recognition component 2CX0904, as well as from other sources, (such as market data 5XA0131, reference data 5XB0131, voice and e-communications surveillance systems 5DX9999, and news feeds 5DB9999, as well as cases in the Audit Trail database 3TX0121) to discover relevant business intelligence to strengthen the framework and algorithms (described below with reference to FIG. 14-16). The findings are used to substantiate any changes to the models and logics, which can be input into the crowd computing component 2FX0107 and lead to further adjustments. Using frameworks and algorithms (block 2D10304 and 2DJ9999), the models and logics component 2DX0105 computes results for back-testing and what-if evaluations in conjunction with the simulator 2BX0415. Using the results of the evaluation, a set of parameters and boundaries, and anything that may be considered to be 'out-of-whack', are defined (block 2DG0320), described further below with reference to FIG. 19. The parameters and boundaries are used to define or update control lists or rules 2JA0113 used by the basic control component 2AX0101 and advanced filtering criteria 2JC1207 used by the detection engine 2BX0104 and the backstop assurance component 2EX0106. The detection engine 2BX0104 and the backstop assurance component 2EX0106 guide the analytical system 2XX0100 in the detection of irregularities, the monitoring of trade behavior, the identification and investigation of potential trade misconduct. Problematic trade orders detected are then sent to the case management component 3CX0140 and the order book replay simulator 3BX0415 for further processing. The detection engine 2BX0104 and backstop assurance component 2EX0106 draws upon the results from the models and logics component 2DX0105 in configuring the inventory plan (block 2DC0701) and RENTD (block 2DB0703) (with consideration of observed realities) and in computing the gross and aggregate risk exposure (block 2DA0906) (described above with reference to FIGS. 8 and 11). Results from the models and logics component 2DX0105 are further used by the detection engine in computing market maker risk profiles (block 2DF0811), to look for size/market timing inconsistencies (block 2DE0810), and to perform the ABC analysis 2DD0805 (described above with reference to FIG. 8). The simulator 3BX0415 also drawings upon the results of the models and logics component 2DX0105, including the set parameters and boundaries and the hypothetical profit and loss (P&L), Sharpe ratio, drawdown rate, etc. (described below with reference to FIG. 19), as computed by the models and logics component 2DX0105.

FIG. 14 illustrates exemplary frameworks and algorithms for use with the analytical system 2XX0100 according to some embodiments of the present invention. The frameworks and algorithms are used to gauge a plurality of factors, for example market micro-structure, clients/counterparties, instruments, risk, liquidity, capital, inventory, and other considerations to determine suitable parameters for the filtering criteria 2JC1207. The frameworks and algorithms define the what, when, and where there may be irregularities and sets appropriate parameters to guide the related controls. Financial institutions typically have many performance indicators, such as risk, liquidity, capital, etc. These measurements are prepared by different departments in silos. The framework illustrated in FIG. 14 creates an equivalent of a balanced scorecard, with appropriate focus drawn to the external markets, clients versus counterparties (e.g. in avoidance of conflicts), responsible use of financial instruments, maintain sufficient liquidity, and optimize risk, capital, and securities inventory.

Figure 15:
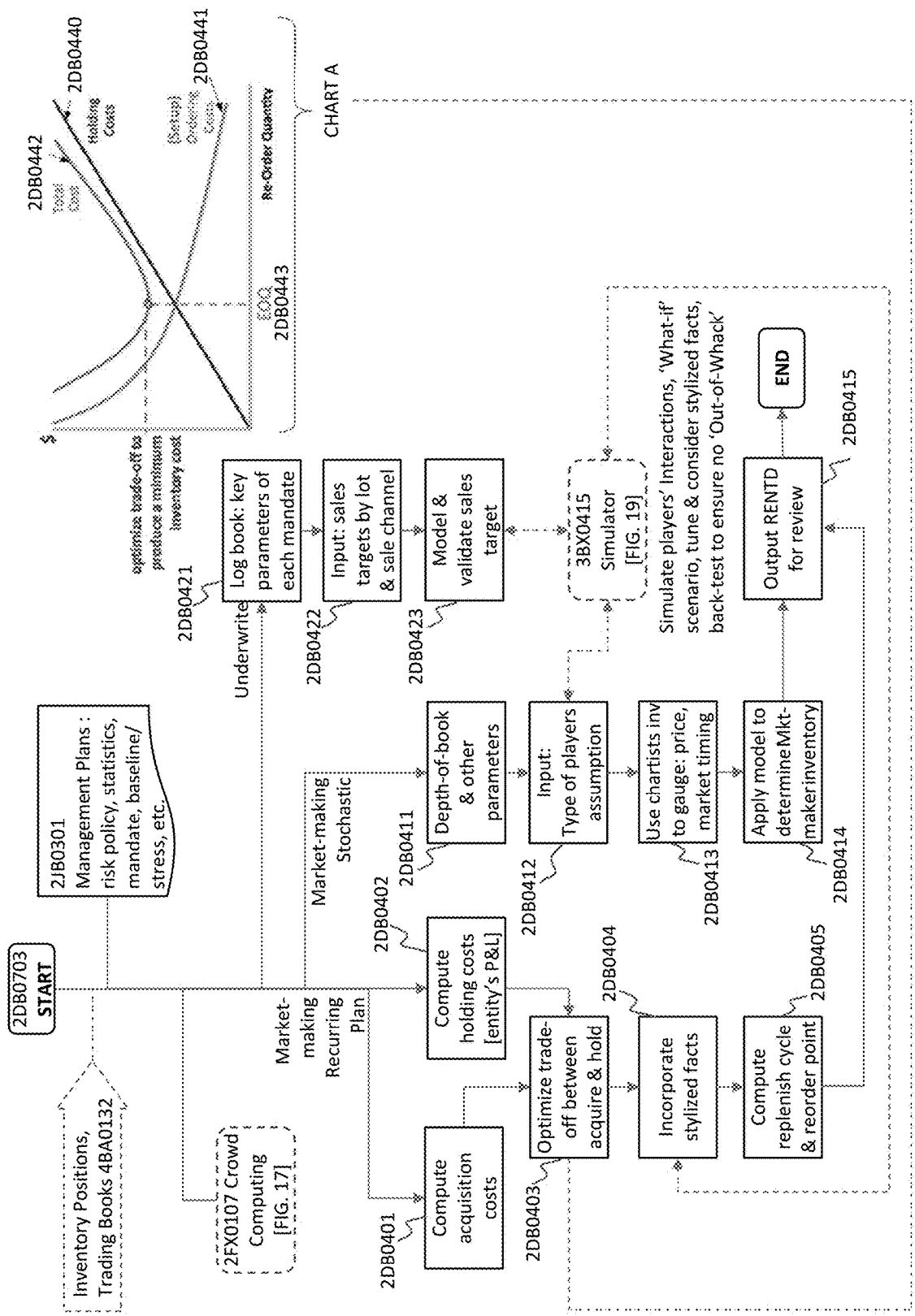
FIG. 15 illustrates a method for determining the reasonably expected near-term demand (RENTD) according to some embodiments.

FIG. 15 illustrates a method for determining the reasonably expected near-term demand (RENTD) according to some embodiments. The trading desk's inventory would have to be designed not to exceed, on an ongoing basis, the RENTD of customers based on such things as historical demand and consideration of market factors. In additional, RENTD is a requirement to gauge the reasonableness of market timing and order size for an entity's securities inventory to fulfill an entity's market making and underwriting plans. For market making activities, two approaches may be used. One approach is based on a recurring plan model, and the other approach is based on an event-driven model. For deterministic aspects of the capital market that follows historical projections, a recurring plan model may be used. For the recurring plan model approach, the Economic Order Quantity (EOQ) model is applied to financial instrument inventory to determine what "reasonable" inventory is for the RENTD. The EOQ may be viewed as the quantity that minimizes the total inventory holding costs and ordering costs, balancing the trade-off between them. Variables considered include the unit purchase price, order quantity, optimal order quantity, annual demand quantity, fixed cost per order, and annual holder cost per unit.

As illustrated in FIG. 15, in implementing the recurring plan model, the models and logics component 2DX0105 computes the acquisition costs (block 2DB0401), such as by using the transaction cost analyzer (TCA) that rates the difference between price of a particular transaction if it were executed at the prevailing price at the time the portfolio manager decided to buy or sell and the actual price of the transaction, including commissions, taxes and other costs (i.e., "slippage"), and the holding costs (block 2DB0402)

that depends on the entities' cost burden (i.e., capital adequacy requirements for banks, or the cost of raising capital or debt in order to carry the inventory) in holding various risky assets. In this exemplary embodiment, total acquisition (setup) costs=cost of placing order (S)*demand (R)/economic order size (Q). In market making, the acquisition costs can generally be referred to as the "expected transaction costs", $C(\overline{Q})$. Many factors influence the expected transaction costs, including, but not limited to, the competitiveness of market makers and trading platforms, tick size (minimum price movement of a trading instrument), market fragmentation, and costs of a bid-ask spread (amount by which the ask price exceeds the bid). In one exemplary embodiment, either a linear model or a square root model, such as the below, may be used to compute the acquisition costs:

$$C(\overline{Q}) = \overline{\sigma}\left[\overline{K}_o \cdot \overline{W}^{-\frac{1}{3}} + \overline{K}_I \cdot \overline{W}^{-\frac{1}{3}} \cdot \frac{|Q|}{V}\right] \quad \text{Linear Model; and}$$

$$C(\overline{Q}) = \overline{\sigma}\left[\overline{K}_o \cdot \overline{W}^{-\frac{1}{3}} + \overline{K}_I \cdot \overline{W}^{-\frac{1}{3}} \cdot \frac{|Q|^{1/2}}{V}\right] \quad \text{Square Root Model,}$$

where $\overline{K}_o$=bid-ask spread,
$\overline{K}_I$=market impact cost,
V=trading volume,
W=trading activity,
$\overline{\sigma}$=daily returns volatility, and
$C(\overline{Q})$=stock-specific cost of executing a bet of Q shares. Alternatively, an entity can use another model determined to best represent the entity's trading desk's order taking, execution, record keeping, exchange costs, hedging costs, and any costs related to the facilitation process and maintenance of the equilibrium of the bid-ask spread. Any model used may be customized through the use of input parameters, including configurable parameters and assumptions applicable to specific trading desks.

In this exemplary embodiment, the holding cost is expressed as a fraction of the unit cost (C) in EOQ or the price of security in trading. When a market maker relies on self-financing, the cost of carrying inventory is the opportunity cost of capital (funding costs) with adjustments to reflect the market maker's risk aversion. Preferably, an additional risk premium (i.e., an expected return on a risky asset exceed the known return on a risk-free asset) be included to take into account any borrowing costs when the market maker's capital is debt-financed. As with computing acquisition costs, any model used may be customized through the use of input parameters, including configurable parameters and assumptions applicable to specific trading desks.

Once the acquisition costs and holding costs are computed, the trade-off between these two costs are optimized to determine a reasonable inventory (block 2DB0403). In this exemplary embodiment, the trade-off is optimized to minimize inventory costs. Chart A in FIG. 15 illustrates graphically the trade-off between the acquisition costs and the holding costs. The graph illustrates a holding costs curve 2DB0440, an acquisition (setup or ordering) curve 2DB0441, and a total cost curve 2DB0442. The bigger the inventory of the market maker, the higher will be the average cost of capital, and the wider will be the bid-ask spread. Hence, the holding costs curve 2DB0440 slopes upward in relation to re-order quantity. The acquisition costs curve 2DB0441 slopes downward in relation to re-order quantity due to the economy of scale. The EOQ (2DB0443) is set to optimize the trade-off between the holding and acquisition costs 2DB0440-2DB0441 to produce a minimum inventory cost. Here, the length of the recurring order cycle=periodic demand divided by EOQ, where the re-order point equals normal consumption during lead-time plus a safety buffer. The length of an "order cycle" refers to the time interval between successive reorder actions. When inventory levels reach a reorder point, then that is the time to replenish the inventory. Otherwise there would not be enough "lead time" to obtain the inventory before it runs out. A firm may want to include a "safety buffer" rather than letting the inventory run out. Stylized facts are empirical findings that have a consistency that are qualitatively accepted as true, within a margin of error configured based on observed realities. The stylized facts are incorporated into the EOQ computation (block 2DB0404). In block 2DB0405, the replenish cycle and reorder point are computed using the EOQ formula.

Some stochastic or event-driven aspects of the capital market do not follow a historical projection or statistical properties of the EOQ described above. For these activities, an event-driven approach may be used. For the event-driven model approach, this exemplary embodiment uses the Grossman Miller Model to determine what "reasonable" inventory is for the RENTD. With the Grossman Miller Model, market liquidity is modeled as being determined by the demand and supply of immediacy. Generally, the number of market makers adjusts to equate the supply and demand for immediacy. This determines the equilibrium level of liquidity in the market. Alternatively, the computation of RENTD forecast may use "market timing" predication methods such as Conditional Expectations, Bayesian Estimation, Kalman Filtering, Martingales Measures, or any combination of these models, instead of or in conjunction with the Grossman Miller Model.

In applying the Grossman Miller Model, two categories of players in the market are assumed: fundamentalists (informed) and chartists (uninformed). Core market makers can be considered fundamentalists, while the other participants in the market may be considered chartists. An entity or trading desk determines the number of fundamentalists based on their own experience and competitive strengths in their specific markets. The Grossman Miller Model defines $M=\sigma^2_v \sigma^2_u/A$, where:
M=number of core market makers;
$\sigma^2_v$=observed variance on asset payoff;
$\sigma^2_u$=observed variance on noise traders' inventory; and
A=expected Sharpe ratio available from trading.

Market price moves quickly and frequently in microseconds, especially in the equity, derivatives, and commodity markets. History is often a poor predictor of the future in these markets. The computation of 2DB0703 RENTD/inventory forecast gauges demand at a certain fair price and gauges when related trade activities may be considered "reasonable". Under the Volcker Rule, variations in price (i.e., delta market value) are a concern for inventory revenues. Through observation and scanning of the market data feed of orders in the market data 5XA0131, the frameworks and algorithms (see FIG. 14) can identify order imbalances (a situation resulting from an excess of buy or sell orders for a specific security on a trading exchange, making it impossible to match the buyers' and sellers' orders) and any liquidity shocks or constraints occurring in the market. In some cases, these indicators may be included in an entity's market data subscription. Based on a standard deviation of noise traders' inventory ($\sigma_u$), observed standard deviation on asset payoff ($\sigma_v$), and an expected Sharpe ratio (A)

available from a trading desk, the computation of RENTD forecast uses the adverse selection model from Grossman Miller to compute the market depth as $\lambda=A(\sigma_v/\sigma_u)$ (block 2DB0411). Market depth refers to the size of an order needed to move the market price by a given amount. The Sharpe ratio is a measure for calculating risk-adjusted return and is the average return earned in excess of the risk-free rate per unit of volatility or total risk. Using the market depth ($\lambda$), other parameters may be extracted, including the observed mean ($\mu$) and variance ($\sigma^2_v$) on asset payoff, as well as the standard deviation of chartists' inventory ($\sigma_u$). The capital market consists of two types of players, fundamentalists and chartists, are then inputted (block 2DB0412). Fundamentalists trade with or against chartists regularly, and the demand quantity ($\bar{u}$) from the chartists players form a rational basis for what is "reasonable" and available to trade for the market makers.

The chartists inventory is then used to gauge the fair price for a reasonable timing (block 2DB0413). Market maker trading profits is a function of the expected squared Sharpe ratio available from trading, from which can be computed the "fair price": $P=(\sigma_v/M)*u-\mu$, or alternatively $P=(A\cdot\sigma_v\sigma_u)*\bar{u}-\mu$, where:
M=number of core market makers;
$\sigma^2_v$=observed variance on asset payoff;
$\sigma^2_u$=observed variance on noise traders' inventory;
A=expected Sharpe ratio available from trading;
$\mu$=observed mean on asset payoff; and
$\bar{u}$=noise traders buy quantity.
These optimal price points are then substituted as the reasonable market timing in order to gauge whether the market makers are faithfully facilitating or providing liquidity to the market with a reasonable bid-ask spread. By applying the Grossman and Miller Model and/or any alternate models to compare the prevailing mean and fair price multiplied by the expected market makers' price stabilizing effect, the computation of 2DB0703 RENTD forecast is able to forecast or determine what should be the "reasonable" market making inventory that the banking entity or trading desk should carry, as $\chi=M\cdot(\mu-P)/\sigma^2_v$ (block 2DB0414). Alternatively, interactions between players can be simulated via the simulator 3BX0415 to simulate player's' interactions, what-if scenarios, to tune and consider stylized facts, and to perform back-tests to ensure no 'out-of-whack' scenarios, described further below with reference to FIG. 19, to gauge reasonable time and trade range. The RENTD computed by the models and logics component 2DX0105 is then output by the analytical system 2XX0100 (block 2DB0415) to the review system 3XX0140 in order for users to review and back-test the results. Optionally, the models and logics component 2DX0105 for RENTD forecast may receive adjustments to the inventory level from users, based on, for example, the users' expectations and synchronization with their risk management policies 2JB0301. Each adjustment would be accompanied by documented justifications and rationale for the adjustments. Once the inventory level is finalized, the computation of RENTD forecast can be used to set boundaries of what constitute as 'reasonable' range of trade and market-time, and what may consider as 'out-of-whack', and the advanced filtering criteria 2JC1207 are updated accordingly, as described with reference to FIGS. 13, 17, and 19.

For underwriting activities, the goal of computing the RENTD forecast is to capture and register key parameters pertaining to each underwriting activity. When an entity has an existing equity and/or debt capital market underwriting system, the processing of underwriting activities for the RENTD forecast may be optional or may be integrated into the existing system for registering new, or updating existing, equity or debt offerings, so that the related underwriting inventory figures and timings can be populated into the inventory plan to set parameters and boundaries. The models and logics component 2DX0105 processes underwriting activities according to underwriting mandates (a part of the 2JB0301 management plan). The underwriting mandate may include, but is not limited to, the following information: the type of instrument, the lot size or number of shares being sold and for which the banking entity is responsible for; any offering price restriction; duration of offers; and green-shoe options, where a special provision in an initial public offering (IPO) prospectus allows underwriters to sell investors more shares than originally planned by the issuer.

The models and logics component 2DX0105 for RENTD forecast captures and registers the key parameters in a log book for each underwriting job (block 2DB0421). Under the Volcker Rule, new underwriting lots must be registered for subsequent associating or linking of related trade activities with the specific lot. Any updates to a registered lot must be supported by proper justifications captured and documented in the audit trails database 3TX0121. The models and logics component 2DX0105 for RENTD forecast also inputs sales targets by underwriting lot for different sales teams (block 2DB0422). Example inputs of sales targets by underwriting lot may be for, but are not limited to: mutual fund distribution; retirement plan and endowments; high net-worth investors; and retail sales desks. In a process to determine the price of an asset in the marketplace, roadshows and solicitation campaigns may be run by the banking entity or sales desk to gauge the market interests in the investment. Institutional investors may provide their indications of interest (MI) for their commitments to buy certain number of shares from the underwriting lots at various prices. From this information, the models and logics component 2DX0105 for RENTD forecast may anticipate how much will be bought by non-IOI customers from different sales channels. The models and logics component 2DX0105 for RENTD forecast then models the underwriting sales targets (block 2DB0423) and validates the sales target by using the simulator's 3BX0415 'What If' scenarios and back-testing functions. Success or completion of underwriting mandates is often a function of a variety of factors, including, but is not limited to: market sentiment; entity or sales teams' marketing power to lock in sizeable commitments; and effectiveness of solicitation campaigns. These factors are modeled into an algorithm for forecast and prediction by the models and logics component 2DX0105 for RENTD forecast. Historical data, consistent with correlations between sales efforts, market environment, and sales effectiveness, may be cross-referenced by the algorithm to validate the sales targets.

In this exemplary embodiment, the allotment committed by the banking entity to underwrite, either with or without a green-shoe option, is the forecast or expected shares to have in inventory. Adjustments may be made to customize for prevailing market sentiments, available competing products with similar risk and return attributes, and changes in customer appetites. The timing (i.e., underwriting job duration) and inventory figures are then populated into the securities inventory plan to set parameters and boundaries of what constitute as 'reasonable' range of trade and market time, and what may consider as 'out-of-whack', described further below with reference to FIG. 19.

Figure 16:
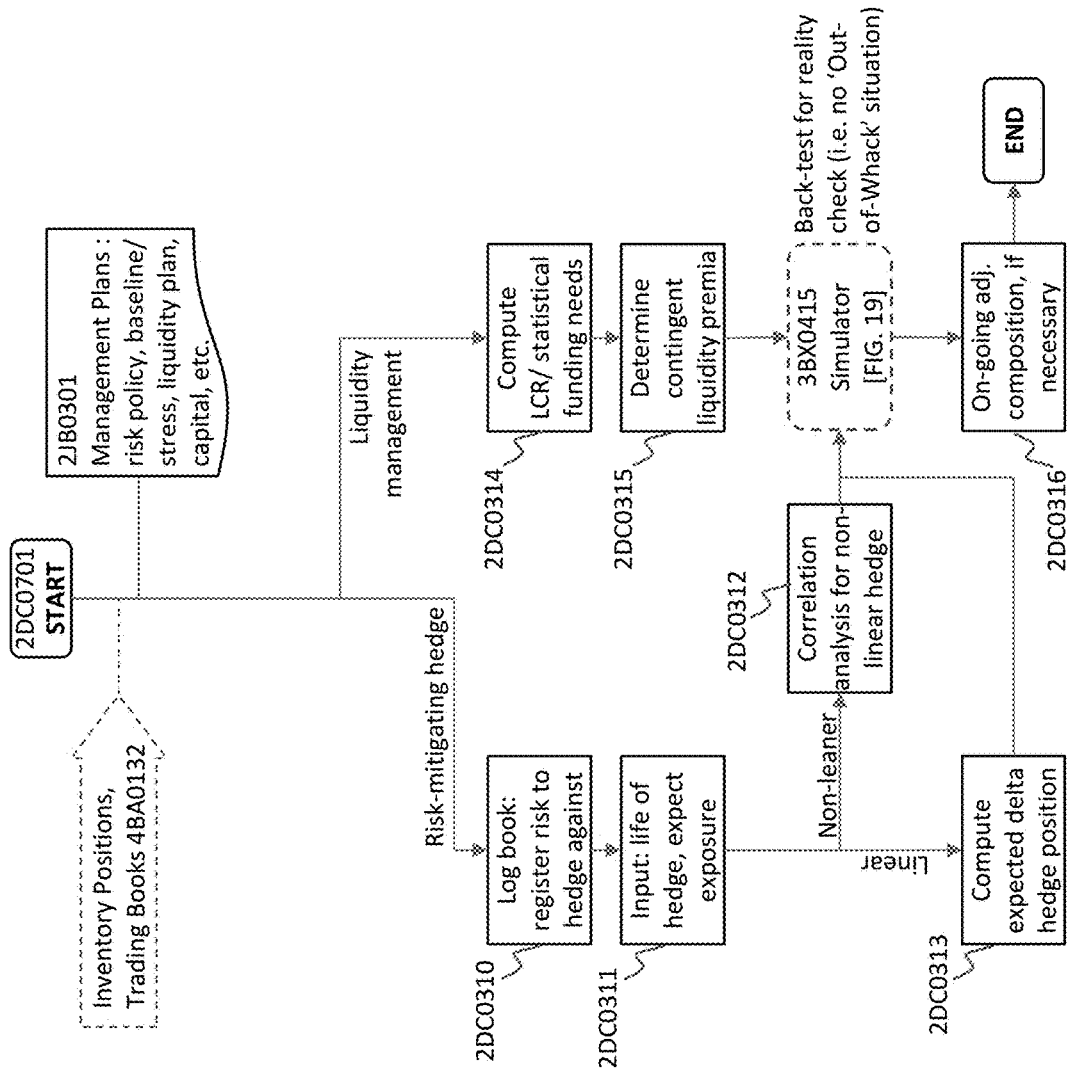
FIG. 16 illustrates an exemplary method for creating the inventory plan to guide an entity's risk mitigating hedge and liquidity management activities, according to some embodiments.

FIG. 16 illustrates an exemplary method for creating the inventory plan to guide an entity's risk mitigating hedge and liquidity management activities, according to some embodiments. Risk mitigating hedge and liquidity management categories are not technically a "demand" from a customer in the context of RENTD for Volcker compliance, but rather are activities necessary for trading operations. However, these activities affect how much inventory the entity should have in order to manage its solvency and risk exposure and are thus considered in creating the inventory plan. The inventory plan is a document summarizing the RENTD outputs, assumptions, plan changes over time, and the related rationale for the changes. A banking entity can use the inventory plan to demonstrate to regulators the reasonableness in establishing the basis of the banking entity's inventory level. For the risk mitigating hedge category, the risk to hedge against is registered in this category (block 2DC0310), and the expected exposure and life of the hedge is entered (block 2DC0311). The models and logics component 2DX0105 for inventory plan forecast computes the expected delta hedge position for linear hedge positions (block 2DC0313) and performs a correlation analysis for non-linear hedges or receives pre-calculated input from internal or external sources (block 2DC0312). Based on the expected delta hedge position, the composition of the portfolio may be adjusted in order to remain compliant, if necessary (block 2DC0316). The models and logics component 2DX0105 for inventory plan forecast then models and validates the expected delta hedge position or the non-linear hedges using the simulator's 3BX0415 'What If' and back-testing functions.

For the liquidity management category, the models and logics component 2DX0105 for inventory plan forecast computes or receives the liquidity coverage ratio (LCR) and the statistical funding needs of the financial institution positions from internal or external sources (block 2DC0314), determines the contingent liquidity premia inherent in the products (block 2DC0315), and may make adjustment to the composition of the portfolio as needed to fulfill the liquidity management plan, if necessary (block 2DC0316). Any adjusted portfolio composition is fed back to the models and logics component 2DX0105 to amend the inventory plan or update the advanced filtering criteria 2JC1207, if necessary, via the crowd computing component 2FX0107, described further below with reference to FIG. 17.

Figure 17:
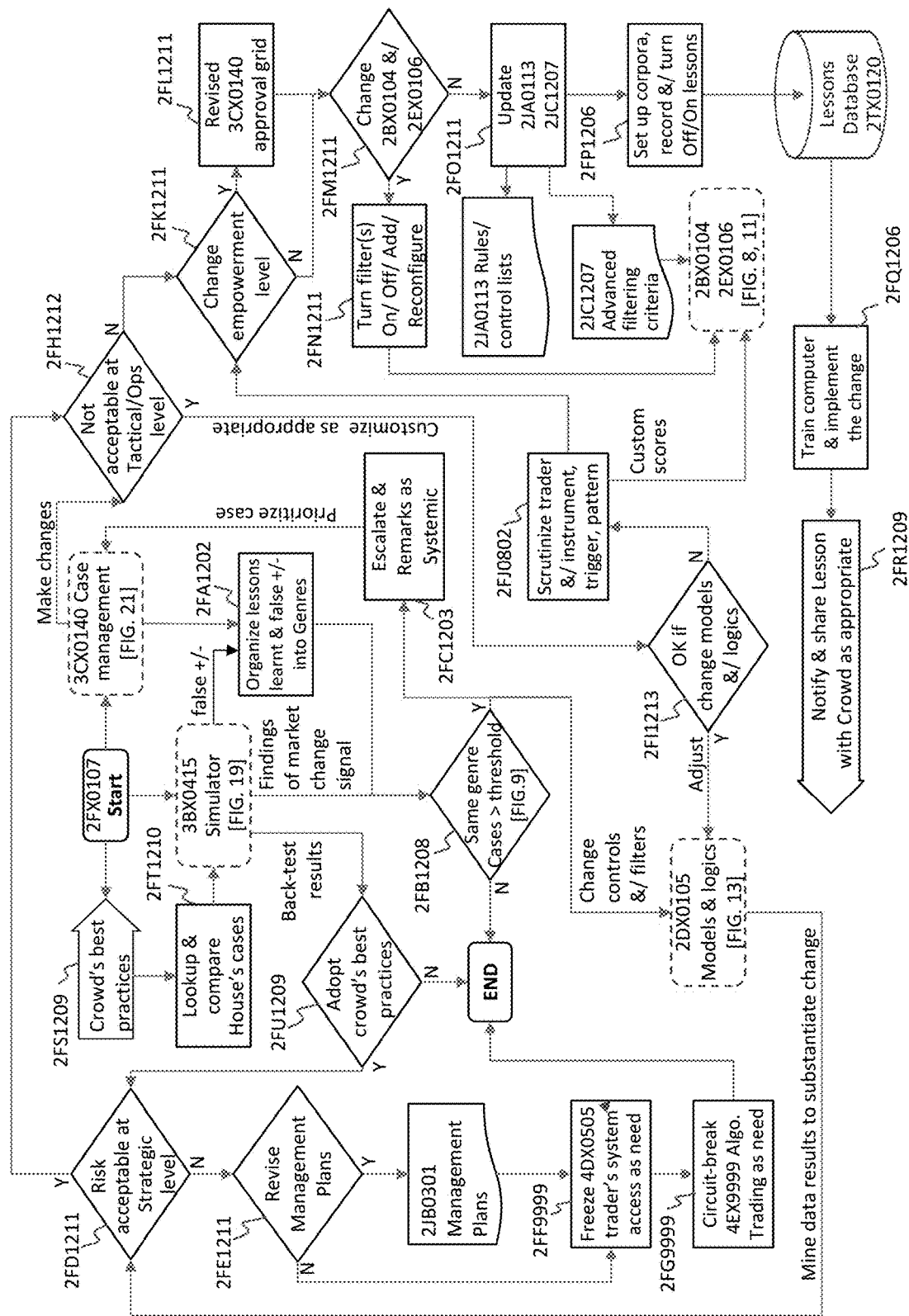
FIG. 17 is a flowchart illustrating an exemplary method for crowd computing processing according to some embodiments.

Returning to FIG. 7, after the detection engine 2BX0104 examines the trade activities, the trade activities outside of the allowable parameters are filtered. The scoring method used is based on the magnitude of the resulting implications of related trades, or a system user may scrutinize particular traders, tradeable objects or targets, or a particular trade pattern or some triggers within a pattern by skewing the respective scores to tighten or loosen the filtering mechanism (see FIG. 8). The scoring process performed by the detection engine 2BX0104 is particularly useful for addressing trade orders that are in the "grey" areas (e.g. a particular trade or order may look legitimate and comply with desk specific controls 2JA0113, while a series of trades in combination may signify abnormal trading activities or where the aggregate risk levels are beyond a predefined threshold that are deemed 'material' requiring appropriate management attention). When a trade order or a series of trades is identified as failing to meet the threshold, the trader 4DX0505 associated with the trade order may be scrutinized in the later described crowd computing process 2FX0107 (FIG. 17). The identified trader and the reason why the trade activity is being flagged or quarantined are saved in the flag/quarantine database 2TX0122. Upon passing the check points in detection engine 2BX0104, the trade is subjected to further review by the backstop assurance component (block 2EX0106). When scores meet certain customizable threshold, alerts are generated or the trade order and/or processed trade records are tagged with escalate notifications and sent to the case management component 3CX0140. A copy of the trade orders and/or processed trade records that were tagged with alerts and escalate notifications are stored in the flag/quarantine database 2TX0122. Alternatively, the tagged trade orders are stored in the quarantine/flag database 2TX0122 in order to withhold the trade order from further processing in the OMS/EMS 4AX0211 per management discretions.

The analytical system 2XX0100 can be fine-tuned by the crowding computing component 2FX0107. The actions taken in the case management system 3CX0140 and re-learning false positive and false negative cases can be used to continually fine-tune the filtering algorithms in the analytical system 2XX0100.

FIG. 17 illustrates an exemplary method for crowd computing processing according to some embodiments. An exemplary embodiment leverages the collective intelligence from a network of users (i.e., the "crowd") to monitor market behavior, combat misconduct, learning exceptions, and to customize the various processes performed by the analytical system 2XX0100. The crowd computing component 2FX0107 continuously fine-tunes the filtering rules in an active learning loop. The crowd computing component 2FX0107 receives input from internal and external sources, including data and metadata from within the analytical system 2XX0100 (e.g. lessons database 2TX0120, audit and trails database 3TX0121, and flag/quarantine database 2TX0122, etc.) and from sources outside the analytical system 2XX0100. These inputs are processed and used to update the rules/control lists 2JA0113 and advanced filtering criteria 2JC1207. The crowd computing component 2FX0107 further fine-tunes the filtering scores used by the detection engine 2BX0104 and the backstop assurance process 2EX0106. Users may customize how each pattern and new rule affects the scoring table by region or desk to determine how it can best be used within their organization. Users are also allowed to share with other crowd users any best practices 2FS1209 that they have discovered.

In this exemplary embodiment, the case management system 3CX0140, and via the simulator 3BX0415, determines whether flagged alerts are false alarms, affirms genuine cases, and seek management approval for any temporary tolerance, change, and improvement actions, including but not limited to changes to: trade order amendment; cancelation; management plans 2JB0301; control list 2JA0113; and advanced filtering criteria 2JC1201. At block 2FA1202, the crowd computing component 2FX0107 looks up similar cases in the lesson database 2TX0120 and organizes the cases into genres. The genres may include, but are not limited to: affirmed cases; false positives; and false negatives of different types of trade patterns, such as potential market manipulation, market change signal, synthetically created trades, or likelihood that the set of trade activities will result in a market price move of one or more financial assets. The crowd computing component 2FX0107 determines whether there are cases in the same genres (block 2FB1208). As part of the active learning process, the analytical system 2XX0100 can associate trader identifiers with trade patterns identified through the pattern recognition processing (described above with reference to FIG. 9) of the detection engine 2BX0104. The analytical system 2XX0100 may use the patterns associated with a particular trader identifier to compare consistency in trading styles with similar traders' behaviors. This is helpful to determine whether the same genre cases indicate repeated offenses (i.e. systemic block 2FC1203) by a rogue trader regardless of which trading desk the trader may be "hopping" in the network. If so, then the score can be skewed so that the behavior of this trader is scrutinized and the advanced filtering criteria 2JC1207 are updated.

Upon accumulating sufficient experience with same genre cases (block 2FB1208), the crowd computing component 2FX0107 prompts the users for changes in the controls or filters. The amount of accumulated experience considered to be "sufficient" depends upon the genre and is configurable. Users can mine data, or through an automated mining or crawling method across the analytical system 2XX0100 and the review systems 3XX0140, to substantiate any change, and determine if risk associated with the change is acceptable (block 2FX1211C). The amount of risk considered acceptable is configurable and can be based on business and strategic level considerations. By mining the data of how approvers reviewed various cases in the case management system 3CX0140 and mining approval justifications stored in the audit trail database 3TX0121, field experience of the approvers are aggregated to become insights that are continuously fed back into the analytical system 2XX0100. In this manner, the analytical system 2XX0100 learns and re-learns from any false positive or negative cases.

If risk is not acceptable (block 2FD1211), top management may decide if management plans 2JB0301 need appropriate revision. Also, management has the discretion to freezing of a trader's system access (block 2FF9999) or particular algorithmic trading may be halted ('circuit-break', block 2FG9999) as needed for any urgent and significant risk events that not acceptable according to management plans/policies. If risk is acceptable on a strategic level, but not acceptable for other reasons (e.g. different control rules for different countries/regions) (block 2FH1212), then customized changes are implemented. Optionally, the acceptable risk level may be overridden, and if so, (block 2FI1213), then the parameters of the models and logics component 2DX0105 are adjusted. Through the crowd computing component 2FX0107, data results may be mined via the models and logics component 2DX0105 to substantiate the changes. When setting the initial score in 2BX0104 detection engine (FIG. 8), a control officer may custom skewing the score of any trades submitted by a particular trader or trading algorithm, and/or discourage the use of certain financial instruments/trade venues for a period of time by skewing the ABC analysis, and/or skewing the corresponding score for a particular 'trigger'/'pattern' (FIG. 10) in order to scrutinize related trade activities (block 2FJ0802). The approval grid and empowerment level for the case management system 3CX0140 (described further below) can be revised (blocks 2FK1211 and 2FL1211). The approval grid used with the case management component 3CX0140 can be revised. For example, if the crowd computing component 2FX0107 determines that 'flags' of a certain nature are being approved repeatedly, appropriate powers may be given to junior approvers, relieving top management involvement in operating details. Similarly, when junior approvers make repeated mistakes in approving cases, then the empowerment level may be adjusted back to the senior management. Any of the controls within the detection engine 2BX0104 and the backstop assurance component 2EX0106 can be turned on or off (blocks 2FM1211 and 2FN1211). Optionally, new controls can be defined and added. The control lists 2JA0113 or the advanced filtering criteria 2JC1207 can be updated as per approved actions in 3CX0140 case management system (block 2FO1211). Other customized changes can also be implemented to train the system 0XX0100. In addition to using knowledge from domain experts, the crowd computing component 2FX0107 trains the system 0XX0100 through the simulation of 'what if' scenarios and record lessons by the simulator 3BX0415. Users may record a lesson pertaining to changes and the corresponding impacts of the changes in the lessons database 2TX0120 (block 2FP1206). Using machine learning reinforcement model, the lessons in the lessons database 2TX0120 and accumulated cases are used to train the system 0XX0100 and improve the accuracy of the analytical system 2XX0100 (block 2FQ1206). The training of the computer may involve comparing the training set (new lesson) with the untrained nearest neighbor rule with reference to the earlier described FIG. 9 using the simulator 3BX0415. If the new lesson does not reduce the amount of false positives or negatives, then the lesson may consider as useless. Otherwise, the new lesson is useful and fit for improving the accuracy of onset detection.

Every entity may have their own unique experience or specialties on particular markets, instruments, and/or counterparties to trade with and/or against. The definition of "sufficient" experience may vary across entities. Factors may include, but are not limited to, risk management experience, domain knowledge about supply/demand shift, and understanding of behavior differences by geographic regions. If the entity does not have sufficient experience, then the crowd computing component 2FX0107 displays rules or best practices recommended by the crowd through a notify and share function (block 2FR1209). The crowd computing component 2FX0107 thus provides users the option to adopt, adjust, or not adopt a certain system logic set up by other entities within the network. User may compare the recommended rules or best practices with against their house's cases (block 2FT1210). By using the back-testing function via the simulator 3BX0415, described further below with reference to FIG. 19, the back-test results help to determine if the crowd's best practices may be suitable for use 'as-is' (block 2FU1209) or appropriate adjustments or customization (via blocks 2FH1212, 2FJ0802, 2FL1211, 2FN1211, and 2FO1211) may be needed in order to make the case applicable. The crowd's best practices may be evaluated to determine whether the risk is acceptable at a strategic level (block 2FD1211). If not, then the management plans 2JB0301 may be revised accordingly (block 2FE1211).

Customization of the criteria or feedback of analytical components' effectiveness in this manner helps to reduce false positives and false negatives. Over time, a high level of customization can be achieved to more accurately discern between "reasonable" versus "out-of-whack" conditions. The crowd computing processing component 2FX0107 may also discover cases that denote a possible stress scenario, financial stability threat, or possible crisis situations where the entity may be alerted for possible reforecasting of the RENTD 2DB0703 or for revisiting the inventory plan 2DC0701 to consider possible hedging protections.

Optionally, a "Stress RENTD" trigger may be invoked via the crowd computing component 2FX0107 and the later described simulator 3BX0415, where the inputs and parameters in the RENTD calculation is analyzed against actual market conditions to assess market dynamics in real-time (e.g. macro view of toxic asset distribution, who is standing-by to provide liquidity, and who is under squeezed during market crash). This allows for more timely intervention among the industry and regulators. In one exemplary embodiment, through the crowd computing component 2FX0107, stakeholders can collectively determine the appropriate time to declare a "Stress RENTD" situation, which is a situation in which timely injection of liquidity into the market is essential to prevent a taxpayer bailout of the financial sector.

Review Systems

Figure 21:
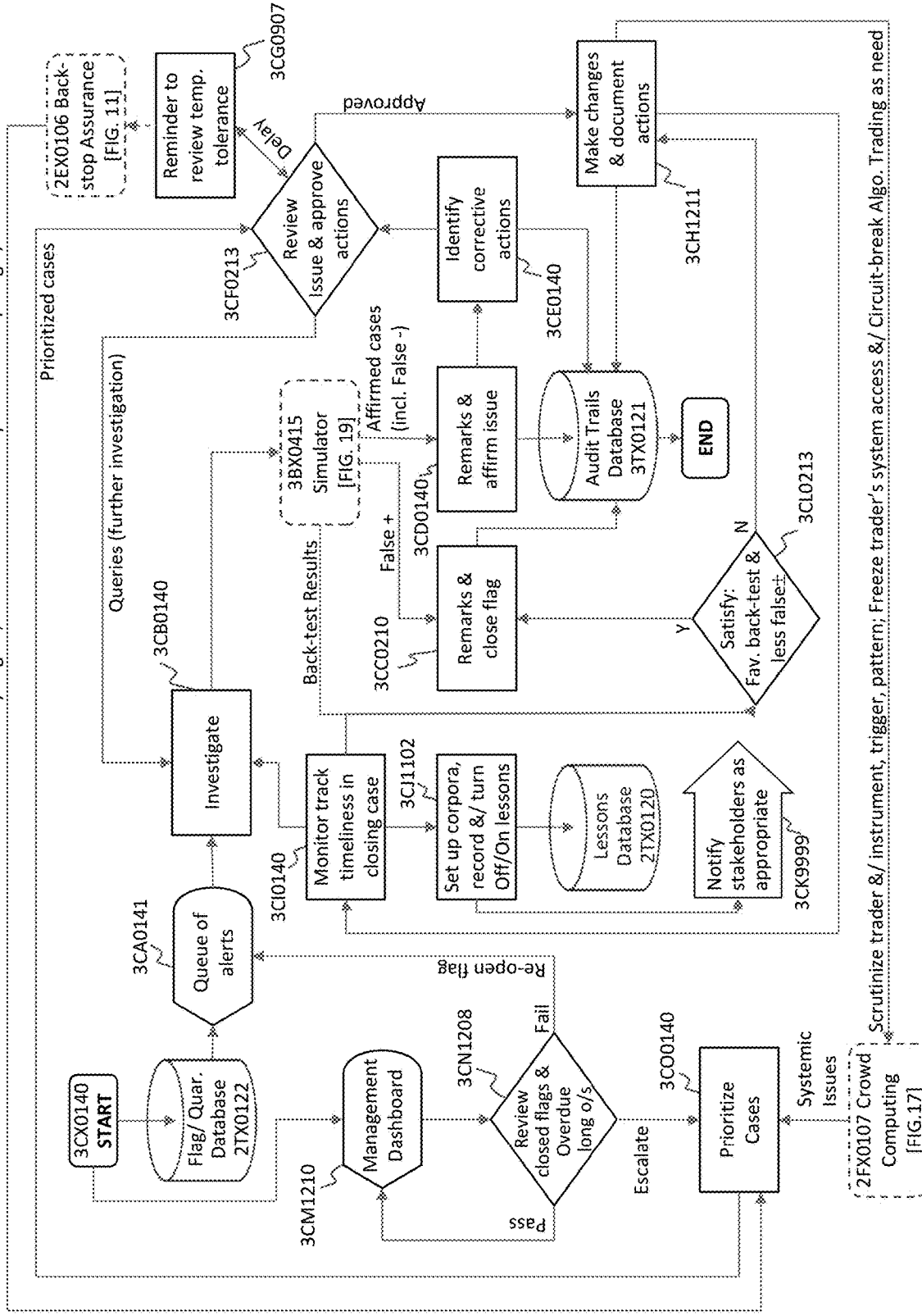
FIG. 21 is a flowchart illustrating a method implemented by the case management component according to some embodiments.

The review systems 3XX0140 include three components: the trade reconstruction component 3AX1206; the order book replay simulator 3BX0415; and the case management component 3CX0140 (see FIG. 1). FIG. 21 illustrates a method implemented by the case management component 3CX0140 according to some embodiments. The case management component 3CX0140 receives and displays a queue of alerts (block 3CA0141), stored in the flag/quarantine database 2TX0122, from the analytical system 2XX0100. At block 3CM1210, the case management component 3CX0140 also displays the alerts as part of a management dashboard. Through the management dashboard, users can view key performance indicators, for example number of open cases, number of prioritize cases that required escalated attention because of materiality or systemic issues, and turnaround time in closing cases, which 'target' or 'trader' may be currently under scrutiny. At block 3CN1208, through the management dashboard, a user can further review closed flags or overdue cases (i.e. timeliness in closing case versus standard turnaround time is monitored and tracked by the case management component 3CX0140) and document the results in the management dashboard to ensure that previously closed cases are resolved and addressed. The user may further re-open a closed 'flag', which places the closed case back on the alert queue where the case is reinvestigated (block 3CB0140). The user may further follow up a long outstanding (O/S) unclosed case by escalating, hence any material, systemic, or long outstanding cases would be prioritized for review (block 3C00140). In the exemplary embodiment, in the review of closed or overdue cases, compliance and control officers may obtain a list of trader identifiers from the management dashboard with the most repeated offenses or flagged or quarantined transactions for proper follow-up and investigation or individual performance review. Particular activities of traders with certain identifiers can be scrutinized and their score skewed accordingly by the crowd computing component 2FX0107. In investigating open flags (block 3CB0140), the case management component 3CX0140 also identifies false negative cases (i.e. 'undetected surprises'/type II error) through the correlation process via the simulator 3BX0415. By identifying and processing these false negative cases, the case management component 3CX0140 minimizing the reoccurrence of false negatives by sharing the false negatives via crowd computing component 2FX0207 and having the false negative cases reflected in the RENTD/inventory plan.

In investigating cases on the alert queue (block 3CB0140), the review system 3XX0140 reconstructs the trade event and replays the order book. FIG. 18 illustrates a method for reconstructing a trade event, implemented by the trade reconstruction component 3AX1206 of the review system 3XX0140, according to some embodiments. The trade reconstruction component 3AX1206 receives data from the data processor 1XX1101 over communication channel 5BX1307. The trade reconstruction component 3AX1206 allows users to select a time span or a previous recorded lesson in the lessons database 2TX0120 (block 3AB9999) and chooses one or more target trading records from the lessons database 2TX0120 to play (block 3AC9999) and retrieves these trading records (block 3AD9999). A target can be, but is not limited to, the followings: a particular stock ticker symbol; Committee on Uniform Security Identification Procedures (CUSIP) of a debt instrument; a hybrid instrument (e.g. Trust Preferred Securities (TruPS); any tradeable object; an entire asset class; trade transacted in particular geographic regions; the smallest discrete unit of a particular trader or trading desk (i.e. a single 'track' in musical terms); or a mix-and-match of 'dimensions'.

Figure 20:
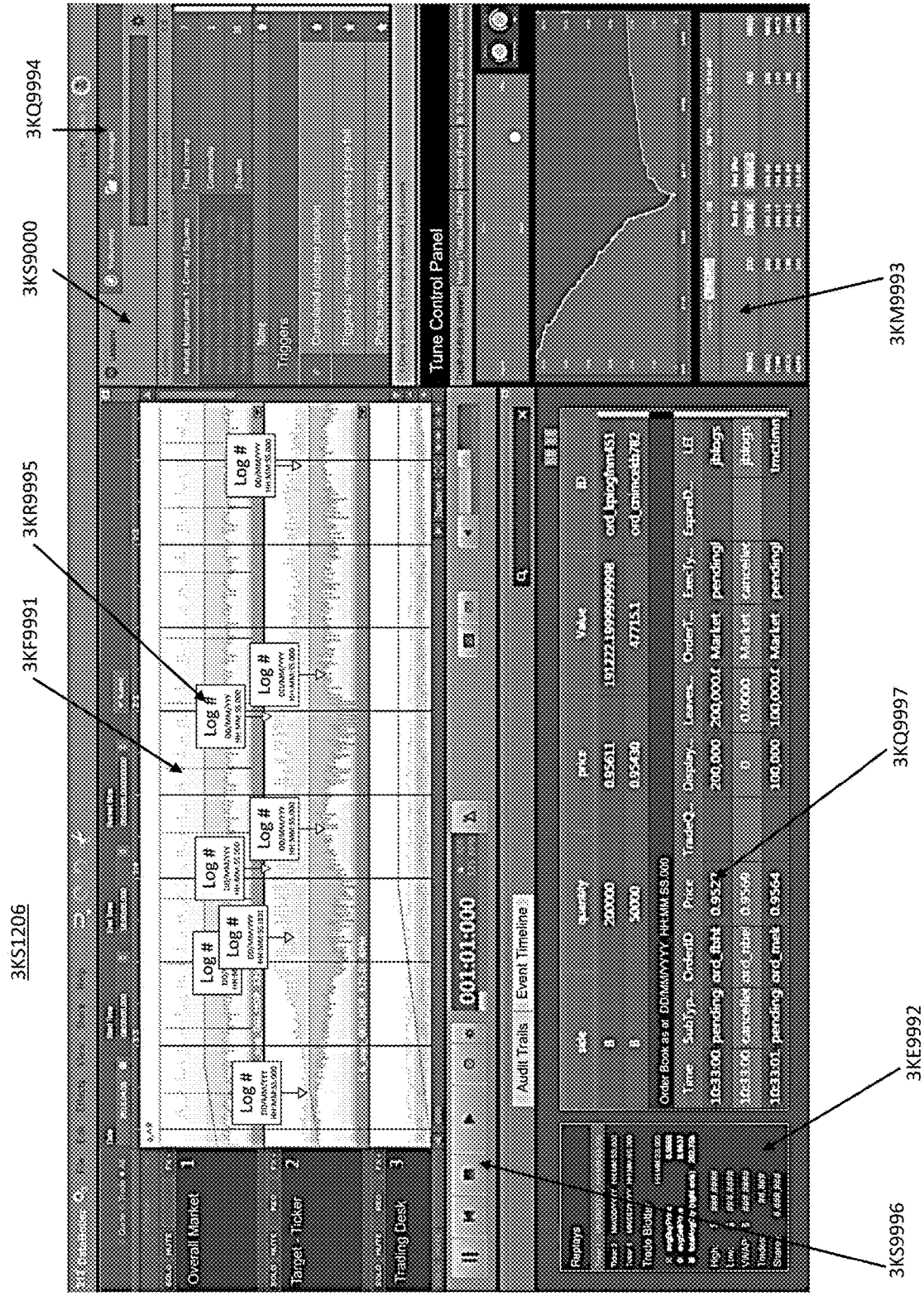
FIG. 20 illustrates an example user interface implemented by the trade reconstruction component.

FIG. 20 illustrates an example user interface 3KS1206 implemented by the trade reconstruction component 3AX1206. Referring to both FIGS. 18 and 20, the trade reconstruction component 3AX1206 displays the retrieved records in a first window 3KF9991 (block 3AF9999) that allow users to decompose, drill down, or aggregate (roll-up) 'tracks' (block 3AG9999) and display the lower and upper dimensions (block 3AH9999). The user interface 3KS1206 allows users to magnify the activities via zoom-in and zoom-out or other similar functions (block 3AI9999), magnify the activities (e.g. view the activities in microsecond, or millisecond, or a tick-by-tick playback) or view activities over a longer period of time (block 3AJ9999). The trade reconstruction component 3AX1206 displays on a second window 3KE9992 a blotter for particular trade (i.e., a record of the particular trade and the details of the trade made over a period of time) and key statistics for the time span, such as high, low, and volume weighted average price (VWAP) (block 3AE9999), that would be updated along with changes in the first window 3KF9991 (block 3AK9999). The trade reconstruction component 3AX1206 displays on a third window 3KM9993 the 'depth-of-book' information (3KM9993) about bids and offers inferior to the best prices that exist nationally (NBBO) (blocks 3AL9999 and 3AM9999). Users may drill down to see a particular lit trading venue, for example a stock exchange, best bid and offer, at a particular point in time (blocks 3AN9999 and 3AO9999). A user may pull the event timeline consisting of information from market event records (block 3AP9999). Market event records may include: outputs from voice or e-communications surveillance systems and news feeds 5DB9999 and audit trails in the audit trails database 3TX0121 that correspond to the select time span of trade activities; tagging coded-links of reference data 5XB0131 and other market event records with the corresponding order books or pricing records in, for example, the prefix of music formatted files or data streams, as appropriate. The trade reconstruction component 3AX1206 displays the relevant timeline's event log files in a forth window 3KQ9994 (block 3AQ9999), which operates like a 'file explorer', and overlays a fifth display 3KR9995 on the first display 3XF9991 (block 3AR9999), showing arrows and log references. A user can mouse-over or click to view a particular event record. The user interface 3KS1206 provides control buttons 3KS9996 for various functions (block 3AS1206), which may include but not be limited to: play; stop; pause; rewind to beginning to replay a trade sequence; cut; or edit. The reconstructed trade event can be recorded as a lesson in the lessons database 2TX0120 to be referenced by the analytical system 2XX0100 or the case management component 3CX0140 may set up a corpora, record and/or turn off or on CEP lessons 3CJ1102 with reference to FIG. 21, or export file to a third party. The controls can further include a toggle to change the first display 3KF9991 to show either audio spectrum or traditional chart view. Trade order details (audit trail) are shown in 3KQ9997. These functions allow a user to interact with the order book replay simulator 3BX0415, the case management component 3CX0140, and the crowd computing component 2FX0107.

Figure 19:
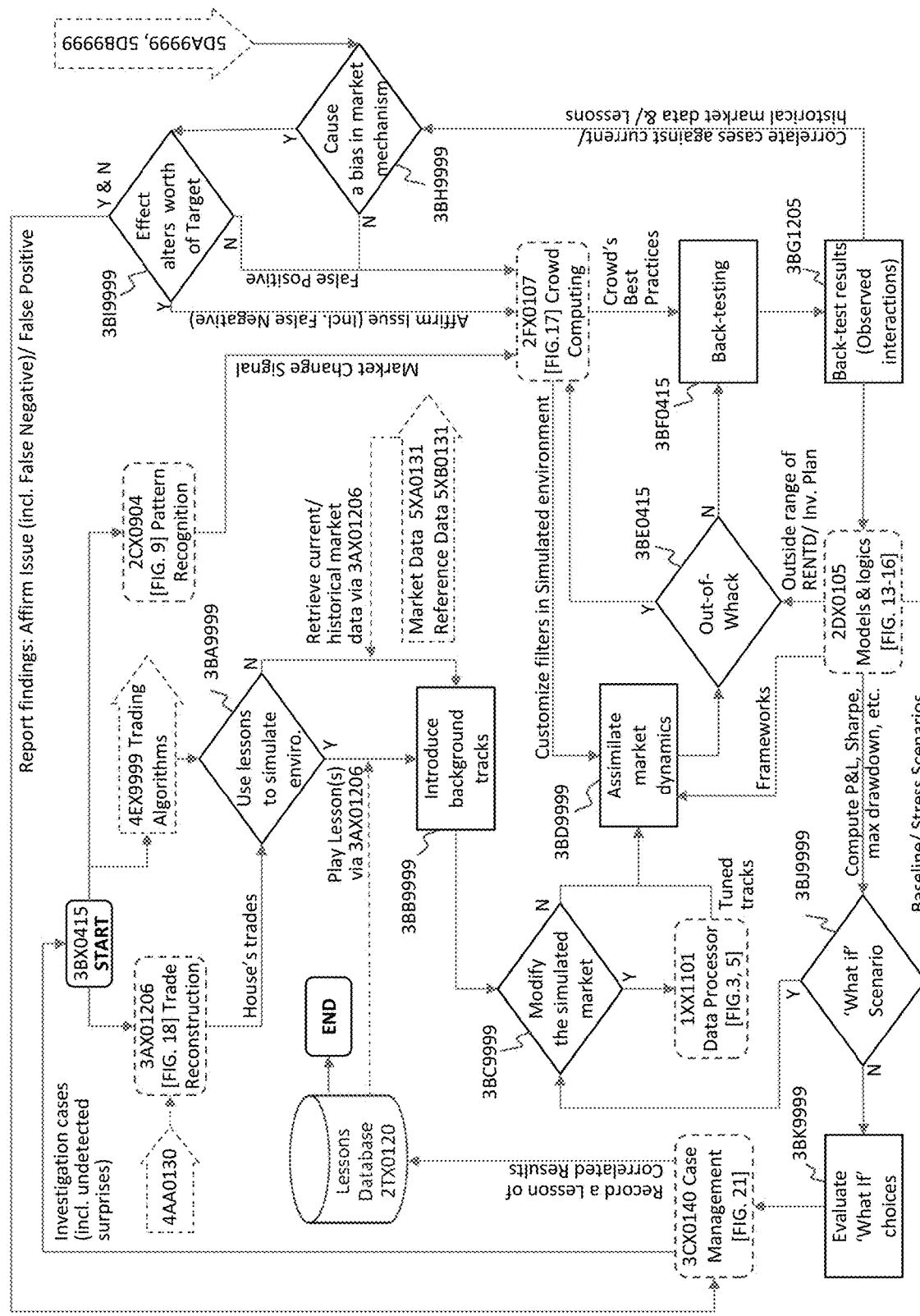
FIG. 19 is a flowchart illustrating a method for assimilating market dynamics and back-testing, implemented by the order book replay simulator, according to some embodiments.

FIG. 19 illustrates a method for replaying the order book, implemented by the order book replay simulator 3BX0415, according to some embodiments. The simulator 3BX0415 replays the order book, assimilates the market dynamics, observes possible market interactions to conduct back-testing and evaluates different 'what if' scenarios. The simulator 3BX0415 assimilates market dynamics (block 3BD9999) by reconstructing the house trades 3AX01206, as described above with reference to FIG. 18, and combining the reconstruction with historical or hypothetical trade records in the market. The simulator 3BX0415 uses a lesson from the lessons database 2TX0120 (block 3BA9999), or retrieves trade records at a particular time span, as basis to simulate the market or stack up tracks using the data processor's 1XX1101 aggregation (propagation) function to replicate particular interactions between market participants and introduce background tracks to represent the hypothetical market (block 3BB9999). Considering possible market change signals via the pattern recognition component 2CX0904, the simulator 3BX0415 may modify the simulated market (block 3BC9999) via the data processor 1XX1101 tuning and composing techniques available in the tune control panel 3KS9000 (FIG. 5). Example tuning includes, but is not limited to: 'reverb' representing the market depth; 'treble/mid/bass' representing activities of 'dark pools' (i.e., trading venues that give investors the opportunity to place orders and make trades without publicly revealing their intentions during the search for a buyer or seller); systematic internalizers (i.e., an investment firm which, on an organized, frequent systematic and substantial basis, deals on its own account when executing client orders outside of trading venues); and lit venues (i.e., opposite of dark pools, where venues display the various bids and offers in different stocks); 'fader' representing relative activities or interaction between banking sector and shadow banking; and boosting loudness or introduce random noise to obfuscate a lesson stored in the lesson database 2TX0120. The crowd computing component 2FX1211 may customize the control filters applying in the simulated environment. In turn, the house trades, the background tracks representing the simulated market, the framework (e.g. maker-taker model, price/time/size priorities) from models and logics 2DX0105, and applicable filtering controls would be assimilated for the evaluation of market dynamics (block 3BD9999).

The simulator 3BX0415 validates the assimilated model for any 'out-of-whack' situations (block 3BE0415). Example out-of-whack situations include, but are not limited to, pricing contradictions between house trades and the model, or unrealistic volatility in a given market (in other words, "unreasonable", opposite and far-off from the range of the previously set RENTD. If no out-of-whack situations are found, then back-testing is performed (block 3BF0415). If out-of-whack situations are found, then the model is re-customized again, as described above and with reference to FIG. 17, before performing back-testing.

At block 3BF0415, back-testing refers to the process of applying a trading strategy (e.g. a series of house's trades) or analytical method to historical data or simulated environment to see how accurately the strategy or method would have predicted actual results and/or to observe how the strategy would have interact with other market participants (block 3BG1205). Back-testing simulation is also suitable for evaluating the performance of a trading algorithm 4EX9999. The simulator 2BX0415, based on back-testing results and through the models and logics component 2DX0105, computes the hypothetical profit and loss (P&L), Sharpe ratio, drawdown rate, etc. to evaluate the trade strategy. The simulator 2BX0415 can also be informed by models and logics component 2DX0105 to apply baseline or various stress scenarios and simulate multiple "What if" scenarios (3BJ9999). These "What if" scenarios are helpful to evaluate what trading algorithms are best suit for different market conditions, so there will be timely switching of trade strategies when the pattern recognition component 2CX0904 picks up or detect a desired market change signal.

The simulator 3BX0415 bases on back-testing results to accesses the correlation against outputs from voice and e-communication surveillance system 5DA9999 and a variety of news feeds 5DB9999. The observed interactions from back-testing results can include, but are not limited to: house trades causing a bias in market mechanism (e.g. tricking the market into believing what false, or violating the efficient market hypothesis); and having or not having an effect on altering worth of a tradeable object (moved the market price). If the trade event does not cause a bias in the market mechanism (block 3BH9999), then the trade event is flagged as a false positive. If so, then the simulator 3BX0415 determines whether the trade event has the effect of altering the worth of the target (block 3BI9999). If not, then the trade event is flagged as a false positive. Otherwise, the simulator affirms the case being rightfully flag/quarantine by the 2XX0100 analytical system or it may also be flagged as a false negative if the trade event wasn't previously flagged by the 2XX0100 analytical system. Cases that are affirmed, false positives, and false negatives are reported to the case management component 3CX0140.

Again, the simulator 3BX0415 may continue the back-testing with other 'What If' scenarios (block 3BJ9999) by re-tweaking the simulated 'model' and customizing the used cases, lessons, or genres. The 'What If' choices are evaluated (block 3BK9999) to yield optimal risk-and-reward results for a trading algorithm. Alternatively, the 'What If' choices are used to rule out or eliminate any irrational investing or 'out-of-whack' situations, hence supporting the affirmation of flagged trade activities as being misconduct and/or unreasonable. In this case, a correlation is established for a potential market abuse or manipulation), and the trade case is recorded in the lessons database 2TX0120 or exported to a third party for further action via the case management component 3CX0140 (in particular, the block 3CJ1102 with reference to FIG. 21).

Returning to FIG. 21, the case management component 3CX0140 further remarks on the investigation findings in the audit trails database 3TX0121 and closes flags of any false alarms (block 3CC0210). All false positives and false negatives (i.e. type I and type II errors) are fed back to the crowd computing component 2FX0107. The case management component 3CX0140 reviews the affirmed cases (block 3CD0140), identifies any corrective actions (block 3CE0140), and approves the corrective actions (block 3CF0213). Corrective actions may include, but are not limited to, making changes to the filtering mechanism in the analytical system 2XX0100 or allowing temporary tolerance to a situation. Information securities controls may be implemented to preserve the privacy and confidentiality of individual trader and trade strategies. For example, designated approvers, according to an approval grid with reference to FIG. 17), are only allowed to see and process flagged/quarantined trade orders in their assigned queue, such as by trading desk or by region or jurisdiction, and traders are only tagged using unique trader identifiers. The case management component 3CX0140 generates reminders of the expiry of any approved temporary tolerance (block 3CG0907). The backstop assurance component 2EX0106 ensures that the cumulative effects of tolerance cases would not inadvertently lead to other problems that may cascade or lead to uncontrollable or difficult to control consequences, or prevents one from abusing the temporary tolerance process to bypass detections, as described above with reference to FIG. 11.

The case management component 3CX0140 applies the changes according to the approved corrected actions and documents the corrective actions taken in the audit trails database 3TX0121 (block 3CH1211). The case management component 3CX0140 monitors and tracks the timeliness in completing the required changes and closes the case (block 3C10140). The status of any overdue or long outstanding unclosed cases may be displayed in the management dashboard. The monitoring process involves the use of the simulator 3BX0415 for back-testing and basing on the back-testing results to consider if further changes to corrective/improvement actions need to be made or further investigation may be required until the number of outliers or exceptions are below a configured threshold (block 3CL0213). Once fully satisfied, the case management component 3CX0140 closes the flag. The lesson learned is recorded in the lesson database 2TX0120 (block 3CJ1102). Stakeholders, such as the Regulators are notified as appropriate (block 3CK9999). The false positives, false negatives, and learned lessons are fed into the crowd computing component 2FX0107, as described above with reference to FIG. 17.

Figure 22:
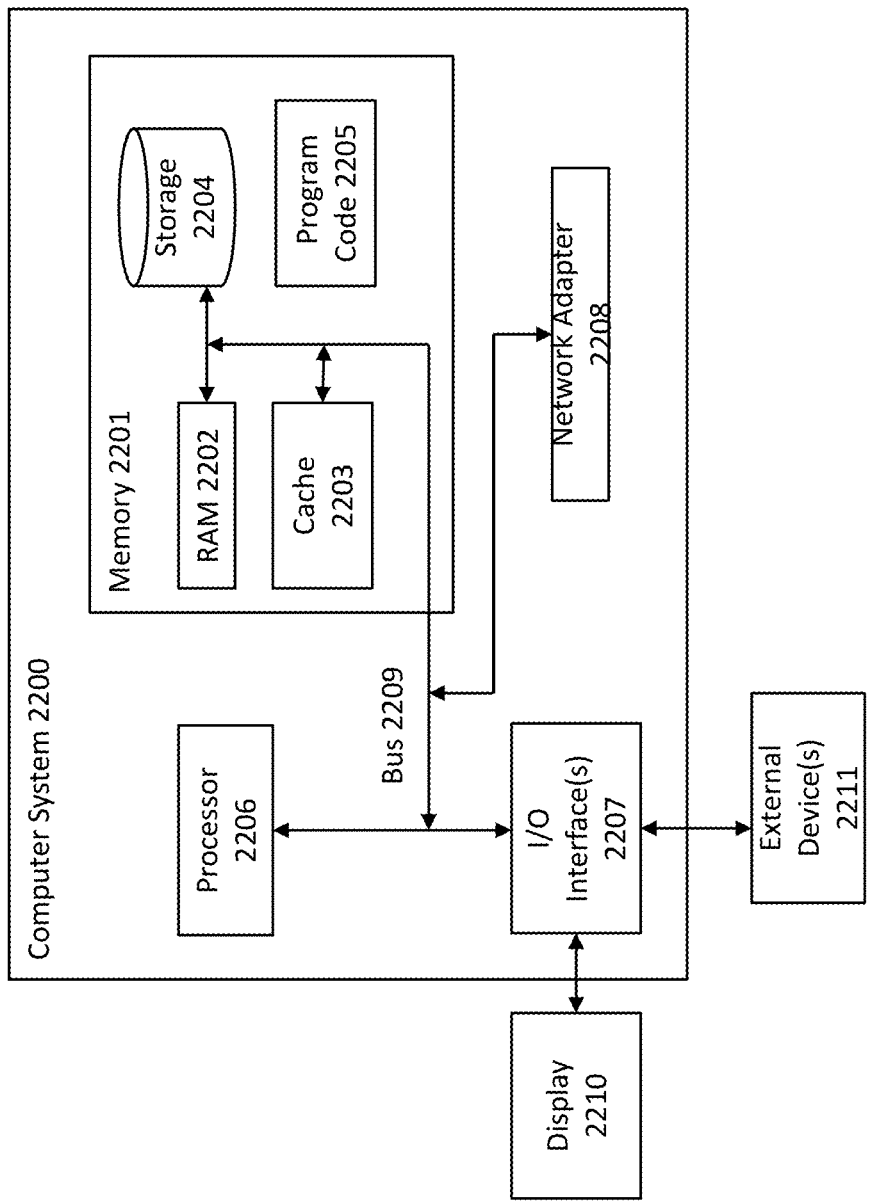
FIG. 22 is a block diagram of components of a computer system, one or more of which are used to implement various embodiments of the present invention.

FIG. 22 is a block diagram of components of a computer system, one or more of which are used to implement various embodiments of the present invention. The components of computer system 2200 may include, but are not limited to, one or more processors or processing units 2206, memory 2201, and bus 2209 that couples various system components, including the memory 2201 to the processor 2206. The bus 2209 represents one or more of any of several types of bus structure, including a memory bus or memory controller, a peripheral bus, an accelerated graphics port, and a processor or local bus using any of a variety of bus architectures. The memory 2201 may include computer readable media in the form of volatile memory, such as random access memory (RAM) 2202 or cache memory 2203, or non-volatile storage media 2204. The memory 2201 may include at least one program product having a set of at least one program code module 2205 that are configured to carry out the functions of the illustrative embodiments of the present invention when executed by the processor 2206. The computer system 2200 may also communicate with one or more external devices 2211, such as a display 2210, via I/O interfaces 2207. The computer system 2200 may communicate with one or more networks via network adapter 2208.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer usable or computer readable storage medium providing program code for use by or in connection with a computer or any instruction execution system. For the purposes of this description, a computer usable or computer readable storage medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

CONCLUSION

Embodiments of an improved system for the detection and analysis of trade data is described above. In some embodiments, as described above with reference to FIG. 6, data points in the trade activities are transformed into a music piece representation. The music piece representation is converted into metrical tree. This yields a data structure with a smaller size than conventional technical analyses using vectors, resulting in reduced storage resource requirements. The storage resource savings increases as the volume of trade data increases. The comparison process, described above with reference to FIGS. 9-10, are performed using the metrical tree to analyze trends in tradeable instruments or markets, thus, reliance on plot charts and the measuring of vectors graphically, as in conventional methods, are avoided. Further, the smaller size of the metrical tree allows the comparison process to be performed more quickly and more timely than conventional technical analyses. This in turn reduces the latency in the comparison process, allowing for the identification of essential signals or warnings in a timely manner for the regulatory agencies, such as the SEC, FINRA, electronic marketplaces (such as the stock exchanges, HFTs and any serious market participants trying to achieve best execution. The use of the smaller metrical tree structure in the comparison process (see FIGS. 9-10), with the CEP lessons in the lessons database 2TX0120, avoid the complex calculations of conventional technical analysis techniques, thus reducing computing resource requirements. The CEP lessons in some embodiments include hypothetical 'What if' scenarios instead of relying only on historical data sets, thus allowing forward looking analysis to prevent undesirable outcomes, such as inadvertently causing a potential market manipulation or conflict with customer, before implementation. The comparison process is able to process a large amount of trade data in real-time, pre-trade, or at trade order analysis, which cannot be reasonably realized through monitoring by a human.

In some embodiments, once the metrical trees are constructed, the comparison process can be performed using a propagation or partially labeled tree approach that gives more emphasis to the information hierarchically contained in the tree than to the tree structure. This leads to more accurate results and findings with fewer errors and greater clock synchronization tolerance.

In addition, audio compression techniques may be leveraged to achieve greater compression of the metrical tree than under conventional financial data compression approaches. In some embodiments, flexibility is improved for a variety of coding methods for lossless or lossy data compression. Lossy methods are able to realize a greater compression ratio than typical financial data compression approaches. In some embodiments, the use of metrical tree representations optimizes the trade-off between acceptable loss of quality and gains in transmission speed and reduction of storage size. Audio codecs can further be leveraged in the obfuscation and encryption of the data in the metrical trees for data protection and other purposes.

In some embodiments, the compressed data is encrypted with time-locked audio codecs, preventing premature access and promoting the fair availability of market data to market participants.

In some embodiments, the system 0XX0100 quantifies the trade data into scores and uses feedback via the crowd computing component 2FX0107 to improve the accuracy of the pattern recognition.

In some embodiments, feedback from crowd sources, via the crowd computing component 2FX0107 and the simulator 3BX0415, are leveraged to improve the lessons in the lessons database 2TX0120 and accumulated cases used to train the system 0XX0100, improving the accuracy of the analytical system 2XX0100. The parameters, lists, and filtering criteria used by the analytical system 2XX0100, including RENTD and the inventory plan, can also be fine-tuned. A "Stress RENTD" trigger may be invoked via the crowd computing component 2FX0107, where the inputs and parameters in the RENTD/inventory plan calculations by different users of the 0XX0100 platform are analyzed against actual market conditions to assess market dynamics in real-time via the 3BX0415 simulator, allowing for more timely intervention that cannot be reasonably realized if the calculations are performed by humans.

In some embodiments, the trade reconstruction component and order book replay simulator provide an objective correlation of trade events with facts in a market event timeline. Trade activities that may or may not have an effect in altering a worth of a targeted financial instrument may be objectively affirmed as suspicious cases. Conventional methods reliance on subjective human comparison of charts or graphics to identify suspicious case, are avoided.

In some embodiments, a user interface is provided which gives an easier way to meaningfully aggregate or decompose financial records by using reverb and other tuning or simulation methods to replicate depth-of-book, and assimilate and represent market dynamics. Complex calculations, such as of asset pricing or payoffs, and deciphering correlations between rollup and the underlying dimensions, are avoided, thus saving computing and processing resources.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for processing and monitoring trade data, the system comprising a computing device having at least one processor, the computing device configured to:
   receive data representing a set of trade activities;
   transform the data representing the set of trade activities to a musical piece representation;
   convert the musical piece representation to a metrical tree, wherein notes of the musical piece representation are recorded in labeled leaf nodes of the metrical tree, and the labeled leaf nodes are connected to unlabeled internal nodes;
   set an initial default value of a score representing a probability of trade irregularity;
   compare the metrical tree to a plurality of trigger trees stored in a lessons database, each trigger tree of the plurality of trigger trees representing a trade irregularity;
   identify at least one trigger tree of the plurality of trigger trees indicating at least a closest match to the metrical tree using a nearest-neighbors algorithm, wherein using the nearest-neighbors algorithm further comprises:
      computing distances between trees using match values, wherein the distance from a trigger tree of the plurality of trigger trees to the metrical tree is an average chance of finding a labeled leaf from the trigger tree in leaf nodes connected to unlabeled internal nodes of the metrical tree; and
      identifying at least a trigger tree having a minimal distance to the metrical tree;
   modify the score to represent an increased probability of trade irregularity as a function of the identification of the at least one trigger tree;
   compare the score to a preconfigured threshold; and
   execute a corresponding action by a review system as a result of the comparison.

2. The system of claim 1, wherein the transforming comprises:
   representing trade activities in the set as notes and trade inactivity as rests in the musical piece representation, wherein each note represents a trade order in the set of trade activities;
   placing each note representing a buy order on a treble clef in the musical piece representation;
   placing each note representing a sell order on a bass clef in the musical piece representation;
   setting a pitch of each note in the musical piece representation according to a price value and a length of time a corresponding trade order will remain open;
   setting a tempo of the musical piece representation according to an average speed at which trade orders were filled; and
   setting a time signature of the musical piece representation according to a combination of trade instrument type, venue, and market conditions of the set of trade activities.

3. The system of claim 1, wherein the converting comprises:
  converting each note in the musical piece representation to a leaf node in the metrical tree by the data processor, comprising:
  setting, by the data processor, a level of the leaf node in the metrical tree according to a duration of a corresponding note in the musical piece representation;
  ordering, by the data processor, a plurality of nodes in the metrical tree according to a time order of the notes in the musical piece representation;
  parsing the metrical tree into plurality of tracks, wherein each track comprises a smallest discrete trading unit of the set of trade activities;
  aggregating tracks into dimensions using a partially labelled tree comparison method, wherein each dimension is an organized group of multiple discrete trading units.

4. The system of claim 1, wherein each trigger tree of the plurality of trigger trees includes data representing a pattern selected from a group consisting of potential market manipulation, market change signal, synthetically created trades, and probability that the set of trade activities will result in a market price move of one or more financial assets.

5. The system of claim 1, wherein comparing further comprises:
  recursively performing a computation of an average of chances of finding a labelled leaf in a descendant of a non-labelled inner node in the metrical tree until no matching trigger tree is found describing trade activity having a time span matching a time span of the data representing the series of trade activities.

6. The system of claim 1, wherein the computing device is further configured to store the data representing the set of trade activities using time-lock cryptography.

7. A computer implemented method for processing and monitoring electronic trade data, comprising:
  receiving data representing a set of trade activities by a data processor;
  transforming the data representing the set of trade activities to a musical piece representation by the data processor;
  converting the musical piece representation to a metrical tree by the data processor, wherein notes of the musical piece representation are recorded in labeled leaf nodes of the metrical tree, and the labeled leaf nodes are connected to unlabeled internal nodes;
  setting an initial default value of a score representing a probability of trade irregularity;
  comparing the metrical tree to a plurality of trigger trees stored in a lessons database, each trigger tree of the plurality of trigger trees representing a trade irregularity;
  identifying at least one trigger tree of the plurality of trigger trees indicating at least a closest match to the metrical tree using a nearest-neighbors algorithm, wherein using the nearest-neighbors algorithm further comprises:
    computing distances between trees using match values, wherein the distance from a trigger tree of the plurality of trigger trees to the metrical tree is an average chance of finding a labeled leaf from the trigger tree in leaf nodes connected to unlabeled internal nodes of the metrical tree; and
    identifying at least a trigger tree having a minimal distance to the metrical tree;
  modifying the score to represent an increased probability of trade irregularity as a function of the identification of the at least one trigger tree;
  comparing the score to a preconfigured threshold; and
  executing a corresponding action by a review system as a result of the comparison.

8. The method of claim 7, wherein the transforming comprises:
  representing trade activities in the set as notes and trade inactivity as rests in the musical piece representation, wherein each note represents a trade order in the set of trade activities;
  placing each note representing a buy order on a treble clef in the musical piece representation;
  placing each note representing a sell order on a bass clef in the musical piece representation;
  setting a pitch of each note in the musical piece representation according to a price value and length of time a corresponding trade order will remain open;
  setting a tempo of the musical piece representation according to an average speed at which trade orders were filled; and
  setting a time signature of the musical piece representation according to a combination of trade instrument type, venue, and market conditions of the set of trade activities.

9. The method of claim 7, wherein the converting comprises:
  converting each note in the musical piece representation to a leaf node in the metrical tree by the data processor, comprising:
    setting, by the data processor, a level of the leaf node in the metrical tree according to a duration of a corresponding note in the musical piece representation;
    ordering, by the data processor, a plurality of nodes in the metrical tree according to a time order of the notes in the musical piece representation;
    parsing the metrical tree into plurality of tracks, wherein each track comprises a smallest discrete trading unit of the set of trade activities;
    aggregate tracks into dimensions using a partially labelled tree comparison method, wherein each dimension is an organized group of multiple discrete trading units.

10. The method of claim 7, wherein each trigger tree of the plurality of trigger trees includes data representing a pattern selected from a group consisting of potential market manipulation, market change signal, synthetically created trades, and probability that the set of trade activities will result in a market price move of one or more financial assets.

11. The method of claim 7, wherein comparing further comprises:
  recursively performing a computation of an average of chances of finding a labelled leaf in a descendant of a non-labelled inner node in the metrical tree until no matching trigger tree is found describing trade activity having a time span matching a time span of the data representing the series of trade activities.

12. The method of claim 7, further comprising storing the data representing the set of trade activities using time-lock cryptography.

13. A non-transitory computer readable medium comprising computer readable program code embodied therein, the program instructions executable by at least one processor to cause the at least one processor to perform operations comprising:

receiving data representing a set of trade activities by a data processor;

transforming the data representing the set of trade activities to a musical piece representation by the data processor;

converting the musical piece representation to a metrical tree by the data processor, wherein notes of the musical piece representation are recorded in labeled leaf nodes of the metrical tree, and the labeled leaf nodes are connected to unlabeled internal nodes;

setting an initial default value of a score representing a probability of trade irregularity;

comparing the metrical tree to a plurality of trigger trees stored in a lessons database, each trigger tree of the plurality of trigger trees representing a trade irregularity;

identifying at least one trigger tree of the plurality of trigger trees indicating at least a closest match to the metrical tree using a nearest-neighbors algorithm, wherein using the nearest-neighbors algorithm further comprises:

computing distances between trees using match values, wherein the distance from a trigger tree of the plurality of trigger trees to the metrical tree is an average chance of finding a labeled leaf from the trigger tree in leaf nodes connected to unlabeled internal nodes of the metrical tree; and identifying at least a trigger tree having a minimal distance to the metrical tree;

modifying the score to represent an increased probability of trade irregularity as a function of the identification of the at least one trigger tree;

comparing the score to a preconfigured threshold; and executing a corresponding action by a review system as a result of the comparison.

14. The medium of claim 13, wherein the transforming comprises:

representing trade activities in the set as notes and trade inactivity as rests in the musical piece representation, wherein each note represents a trade order in the set of trade activities;

placing each note representing a buy order on a treble clef in the musical piece representation;

placing each note representing a sell order on a bass clef in the musical piece representation;

setting a pitch of each note in the musical piece representation according to a price value and length of time a corresponding trade order will remain open;

setting a tempo of the musical piece representation according to an average speed at which trade orders were filled; and setting a time signature of the musical piece representation according to a combination of trade instrument type, venue, and market conditions of the set of trade activities.

15. The medium of claim 13, wherein the converting comprises:

converting each note in the musical piece representation to a leaf node in the metrical tree by the data processor, comprising:

setting, by the data processor, a level of the leaf node in the metrical tree according to a duration of a corresponding note in the musical piece representation;

ordering, by the data processor, a plurality of nodes in the metrical tree according to a time order of the notes in the musical piece representation;

parsing the metrical tree into plurality of tracks, wherein each track comprises a smallest discrete trading unit of the set of trade activities;

aggregating tracks into dimensions using a partially labelled tree comparison method, wherein each dimension is an organized group of multiple discrete trading units.

16. The medium of claim 13, wherein each trigger tree of the plurality of trigger trees includes data representing a pattern selected from a group consisting of potential market manipulation, market change signal, synthetically created trades, and probability that the set of trade activities will result in a market price move of one or more financial assets.

17. The medium of claim 13, wherein the comparing further comprises:

recursively performing a computation of an average of chances of finding a labelled leaf in a descendant of a non-labelled inner node in the metrical tree until no matching trigger tree is found describing trade activity having a time span matching a time span of the data representing the series of trade activities.

18. The medium of claim 13, further comprising storing the data representing the set of trade activities using time-lock cryptography.

* * * * *

UNITED STATES PATENT AND TRADEMARK OFFICE
CERTIFICATE OF CORRECTION

PATENT NO. : 10,672,075 B1
APPLICATION NO. : 16/373625
DATED : June 2, 2020
INVENTOR(S) : Kelvin C. To Page 1 of 1

It is certified that error appears in the above-identified patent and that said Letters Patent is hereby corrected as shown below:

In the Specification

At Column 2, Lines 4-5, "retrieval of trade data in a timely manner is a priority concern" should be "retrieval of trade data in a timely manner are a priority concern"
At Column 7, Line 42, "0X01306" should be "0XO1306"
At Column 7, Line 57, "0X10109" should be "0XIO109"
At Column 7, Line 65, "001300" should be "0XP1300"
At Column 9, Line 59, "The data points in the incoming data is ..." should be "The data points in the incoming data are ..."

At Column 10, Line 3, "treble clef ((= )" should be "treble clef (𝄞)"
At Column 10, Line 3, "bass clef (')" should be "bass clef (𝄢)"
At Column 19, Line 28, "2C01104" should be "2CO1104"
At Column 21, Line 38, "... no 'red-flag' based on this criteria" should be "... no 'red-flag' based on these criteria"
At Column 23, Line 4, "2E110908" should be "2EH0908"
At Column 23, Line 35, "2D110304" should be "2DH0304"
At Column 23, Line 47, "2D10304" should be "2DI0304"
At Column 25, Line 55, "... the trade-off between these two costs are optimized..." should be "... the trade-off between these two costs is optimized..."
At Column 27, Line 18, "The chartists inventory is then ..." should be "The chartists' inventory is then ..."
At Column 31, Line 18, "2FX1211C" should be "2FD1211"
At Column 33, Line 37, "3C00140" should be "3CO0140"
At Column 34, Line 20, "3A19999" should be "3AI9999"
At Column 37, Line 16, "3C10140" should be "3CI0140"
At Column 38, Line 62, "exchanges, HFTs ..." should be "exchanges), HFTs ..."

Signed and Sealed this
Fifteenth Day of September, 2020

Andrei Iancu
*Director of the United States Patent and Trademark Office*